United States Patent
Bushetti et al.

(10) Patent No.: US 12,271,981 B2
(45) Date of Patent: Apr. 8, 2025

(54) GENERATION OF DATA VISUALIZATIONS ON A SINGLE VISUAL REPRESENTATION

(71) Applicant: Kyndryl, Inc., New York, NY (US)

(72) Inventors: Veeresh Bushetti, Savanur (IN); Nalini M, Chennai (IN); Kalpesh Sharma, Bangalore (IN)

(73) Assignee: Kyndryl, Inc., New York, NY (US)

( * ) Notice: Subject to any disclaimer, the term of this patent is extended or adjusted under 35 U.S.C. 154(b) by 255 days.

(21) Appl. No.: 17/973,281

(22) Filed: Oct. 25, 2022

(65) Prior Publication Data

US 2024/0135608 A1  Apr. 25, 2024
US 2024/0233216 A9  Jul. 11, 2024

(51) Int. Cl.
| | |
|---|---|
| G06F 9/44 | (2018.01) |
| G06F 8/77 | (2018.01) |
| G06F 9/445 | (2018.01) |
| G06F 9/455 | (2018.01) |
| G06F 16/26 | (2019.01) |
| G06T 11/00 | (2006.01) |
| G06T 11/20 | (2006.01) |

(52) U.S. Cl.
CPC ............. *G06T 11/206* (2013.01); *G06F 8/77* (2013.01); *G06F 16/26* (2019.01); *G06T 11/001* (2013.01)

(58) Field of Classification Search
CPC ...... G06T 11/206; G06T 11/001; G06F 16/26; G06F 8/77
See application file for complete search history.

(56) References Cited

U.S. PATENT DOCUMENTS

| | | | |
|---|---|---|---|
| 9,299,173 B2 | 3/2016 | Rope et al. | |
| 10,528,583 B2 | 1/2020 | Stolte et al. | |
| 10,672,155 B2 | 6/2020 | Contractor et al. | |
| 10,685,036 B2 | 6/2020 | Berwick et al. | |
| 11,734,626 B2 * | 8/2023 | Santhar | G06F 40/268 |
| | | | 705/7.23 |
| 2021/0110288 A1 * | 4/2021 | Poothiyot | G06F 8/20 |
| 2021/0349623 A1 | 11/2021 | Hou et al. | |
| 2022/0005263 A1 | 1/2022 | Gupta et al. | |

(Continued)

FOREIGN PATENT DOCUMENTS

| | | | | |
|---|---|---|---|---|
| CN | 103354928 B | | 6/2015 | |
| CN | 112558928 A | * | 3/2021 | ........... G02B 27/017 |

(Continued)

OTHER PUBLICATIONS

Nuno Cid Martins, Egocentric viewpoint in mixed reality situated visualization: challenges and opportunities, 2020, pp. 1-7. https://ieeexplore.ieee.org/stamp/stamp.jsp?tp=&arnumber=9373221 (Year: 2020).*

(Continued)

*Primary Examiner* — Mongbao Nguyen
(74) *Attorney, Agent, or Firm* — CANTOR COLBURN LLP; Erik Swanson

(57) ABSTRACT

A computer-implemented method, in accordance with one embodiment, includes collecting data relating to development of a software product, the collected data including a plurality of different types of data relating to the development of the software product. A portion of the collected data is selected based on a characteristic of an intended user, the portion of the collected data including a plurality of the types of data. The selected portion of the collected data is transformed into data visualizations representing the data, the different types of the data having different data visualizations relative to one another. The data visualizations are output in a single visual representation for display to the intended user.

12 Claims, 19 Drawing Sheets

(56) References Cited

U.S. PATENT DOCUMENTS

| | | | | |
|---|---|---|---|---|
| 2022/0019427 A1* | 1/2022 | Davis | ............. | G06F 16/254 |
| 2022/0198779 A1* | 6/2022 | Saraee | ............. | G06F 16/9535 |
| 2022/0279004 A1* | 9/2022 | Erlingsson | ............. | G06F 16/9038 |
| 2022/0413814 A1* | 12/2022 | Mukherjee | ............. | G06F 8/34 |
| 2023/0229668 A1* | 7/2023 | Shao | ............. | G06F 16/26 |
| | | | | 707/756 |
| 2023/0297586 A1* | 9/2023 | Beemanapalli | ....... | G06F 16/283 |
| | | | | 707/602 |
| 2023/0297625 A1* | 9/2023 | Ojo | ............. | G06N 3/09 |
| 2024/0111963 A1* | 4/2024 | Shi | ............. | G06F 40/20 |

FOREIGN PATENT DOCUMENTS

| | | | | |
|---|---|---|---|---|
| CN | 114116881 A | 3/2022 | | |
| WO | WO-2015153039 A1 * | 10/2015 | ....... | G06F 16/24578 |

OTHER PUBLICATIONS

English translation, Anand et al. (WO 2015153039 A1), 2015, pp. 1-51 (Year: 2015).*

English translation, Stump et al. (CN 112558928 A), 2021, pp. 1-32 (Year: 2021).*

Mohammed Ali, Clustering and Classification for Time Series Data in Visual Analytics: A Survey, 2019, pp. 1-25. https://ieeexplore.ieee.org/stamp/stamp.jsp?tp=&arnumber=8930535 (Year: 2019).*

Luay Thamer Mohammed, Big Data Visualization: A Survey, 2022, pp. 1-12. https://ieeexplore.ieee.org/stamp/stamp.jsp?tp=&arnumber=9799819 (Year: 2022).*

Anonymous, "A Smart Visualization Recommendation Method Based on Machine Learning," IP.com Prior Art Database, Technical Disclosure No. IPCOM000269519D, Apr. 24, 2022, 3 pages.

* cited by examiner

| Impactfulness | Computation | Dimension | Variation 1 | Variation 2 | Variation 3 | Variation 4 | Variation 5 | Variation 6 | Variation 7 |
|---|---|---|---|---|---|---|---|---|---|
| H | 10 | Line type | Continuous | Dashed | Dotted | Long dash | Short dash | Long dash Short dash | Long dash dotted |
| M | 4 | Color | Red | Yellow | Blue | Orange | Green | Violet | Purple |
| L | 9 | Thickness | normal | bold | bolder | lighter | 100 | 200 | 300 |
| L | 9 | Fonts | Arial | Verdana | Helvetica | Tahoma | Trebuchet MS | Times New Roman | Georgia |
| M | 8 | Shapes | Triangle | Circle | Semi-Circle | Square | Rectangle | Parallelogram | Rhombus |
| L | 5 | Dimension 6 | Variation 1 | Variation 2 | Variation 3 | Variation 4 | Variation 5 | Variation 6 | Variation 7 |
| S | 5 | Dimension 7 | Variation 1 | Variation 2 | Variation 3 | Variation 4 | Variation 5 | Variation 6 | Variation 7 |
| : | : | : | : | : | : | : | : | : | : |
| H | 10 | Dimension n | Variation n1 | Variation n2 | Variation n3 | Variation n4 | Variation n5 | Variation n6 | Variation n7 |

GENERATION OF DATA VISUALIZATIONS ON A SINGLE VISUAL REPRESENTATION

BACKGROUND

The present invention relates to generation of visuals for software development decision-making, and more specifically, this invention relates to generating visuals and depth based on domain data and available intrinsic visual parameters to represent a maximum number of factors influencing a decision or status.

Success of a software product depends on many factors, such as business need, user requirements, current and future market trends, etc. Any software development takes time to complete, and there is always a risk that some portion of the software might become obsolete before completion.

SUMMARY

A computer-implemented method, in accordance with one embodiment, includes collecting data relating to development of a software product, the collected data including a plurality of different types of data relating to the development of the software product. A portion of the collected data is selected based on a characteristic of an intended user, the portion of the collected data including a plurality of the types of data. The selected portion of the collected data is transformed into data visualizations representing the data, the different types of the data having different data visualizations relative to one another. The data visualizations are output in a single visual representation for display to the intended user.

A computer-implemented method, in accordance with another embodiment, includes determining features of initial data of an initial data set. Possible values for the initial data are computed using the features of the initial data and using predefined knowledge about a domain of the initial data. Data types of the initial data are derived from the possible values. The features of the initial data are correlated to visualization parameters. A unique palette for each of the visualization parameters is selected. Am input data set is received. Input data from the input data set is selected for visualization based on the derived data types. Values of the selected input data are calculated, and the calculated values of the input data are correlated with the possible values for selecting visual parameters for the input data. Visualizations of the calculated values of the input data are generated and output in a single visual representation for display to an intended user.

A computer-implemented method, in accordance with yet another embodiment, includes collecting data relating to development of a software product. Multiple intents of the data are determined based on an assessment of the data. Different viewpoints of the data are created based on the intents. Also, viewpoints for an intended user are obtained. The retrieved viewpoints for the intended user are correlated with the viewpoints of the data. The collected data is transformed into data visualizations representing the data based on the correlation of the viewpoints, different types of the data having different data visualizations with respect to one another. The data visualizations are output in a single visual representation for display to the intended user.

A computer program product for outputting data visualizations in a single visual representation, in accordance with various embodiments, includes a computer readable storage medium having program instructions embodied therewith, the program instructions executable by a computer to cause the computer to perform any of the foregoing methods.

A system, in accordance with various embodiments, includes a hardware processor and logic integrated with the processor, executable by the processor, or integrated with and executable by the processor. The logic is configured to perform any of the foregoing methods.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is the table of FIG. 5.

DETAILED DESCRIPTION

Figure 1:
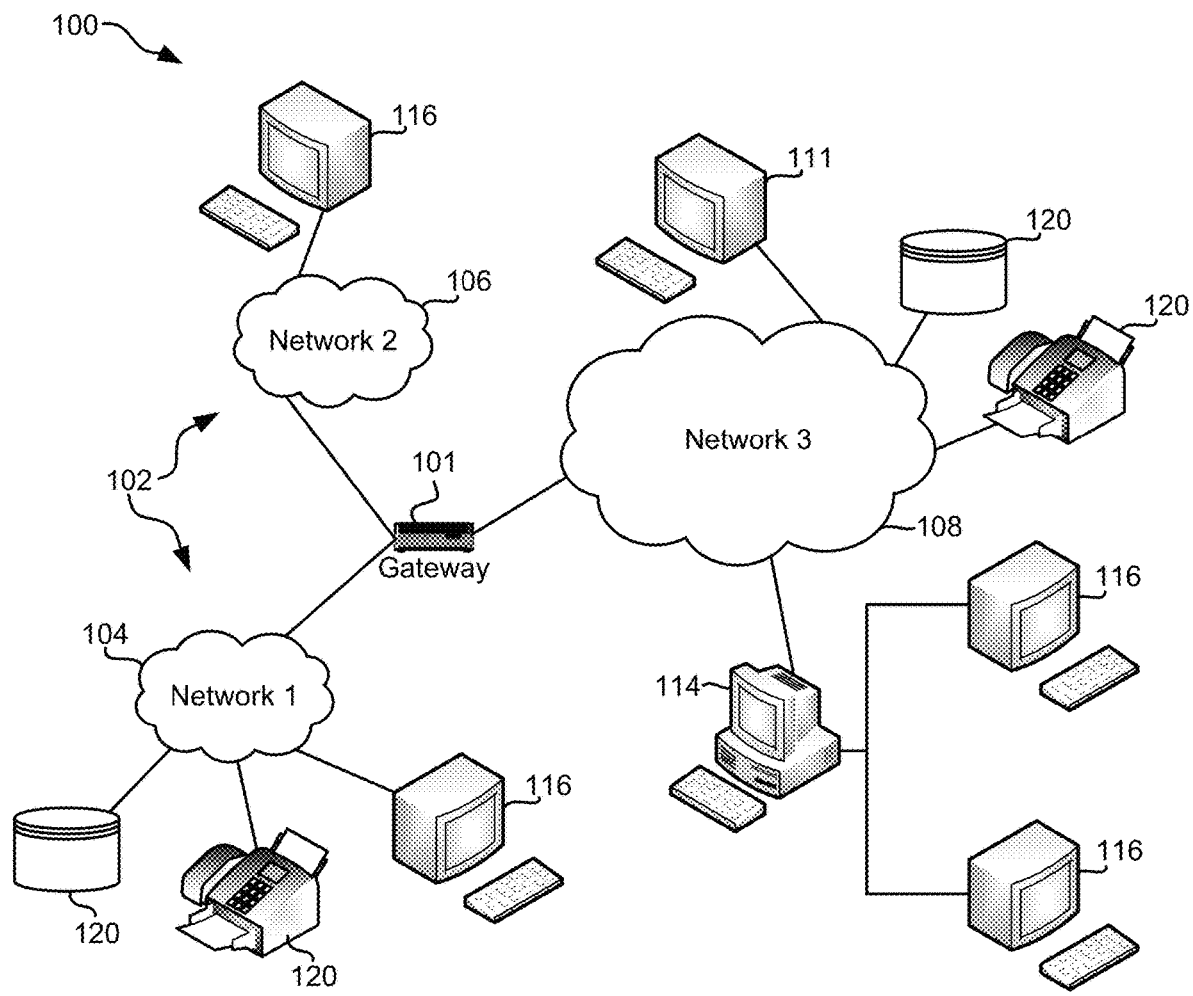
FIG. 1 is a diagram of a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for generating Artificial Intelligence (AI)-based and/or Machine Learning (ML)-based visuals and depth based on domain data and available intrinsic visual parameters to represent a maximum number of factors influencing a decision or status, all in a single interface.

In one general embodiment, a computer-implemented method includes collecting data relating to development of a software product, the collected data including a plurality of different types of data relating to the development of the software product. A portion of the collected data is selected based on a characteristic of an intended user, the portion of the collected data including a plurality of the types of data. The selected portion of the collected data is transformed into data visualizations representing the data, the different types of the data having different data visualizations relative to one another. The data visualizations are output in a single visual representation for display to the intended user.

In another general embodiment, a computer-implemented method includes determining features of initial data of an initial data set. Possible values for the initial data are computed using the features of the initial data and using predefined knowledge about a domain of the initial data. Data types of the initial data are derived from the possible values. The features of the initial data are correlated to visualization parameters. A unique palette for each of the visualization parameters is selected. Am input data set is received. Input data from the input data set is selected for visualization based on the derived data types. Values of the selected input data are calculated, and the calculated values of the input data are correlated with the possible values for selecting visual parameters for the input data. Visualizations of the calculated values of the input data are generated and output in a single visual representation for display to an intended user.

In yet another general embodiment, a computer-implemented method includes collecting data relating to development of a software product. Multiple intents of the data are determined based on an assessment of the data. Different viewpoints of the data are created based on the intents. Also, viewpoints for an intended user are obtained. The retrieved viewpoints for the intended user are correlated with the viewpoints of the data. The collected data is transformed into data visualizations representing the data based on the correlation of the viewpoints, different types of the data having different data visualizations with respect to one another. The data visualizations are output in a single visual representation for display to the intended user.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
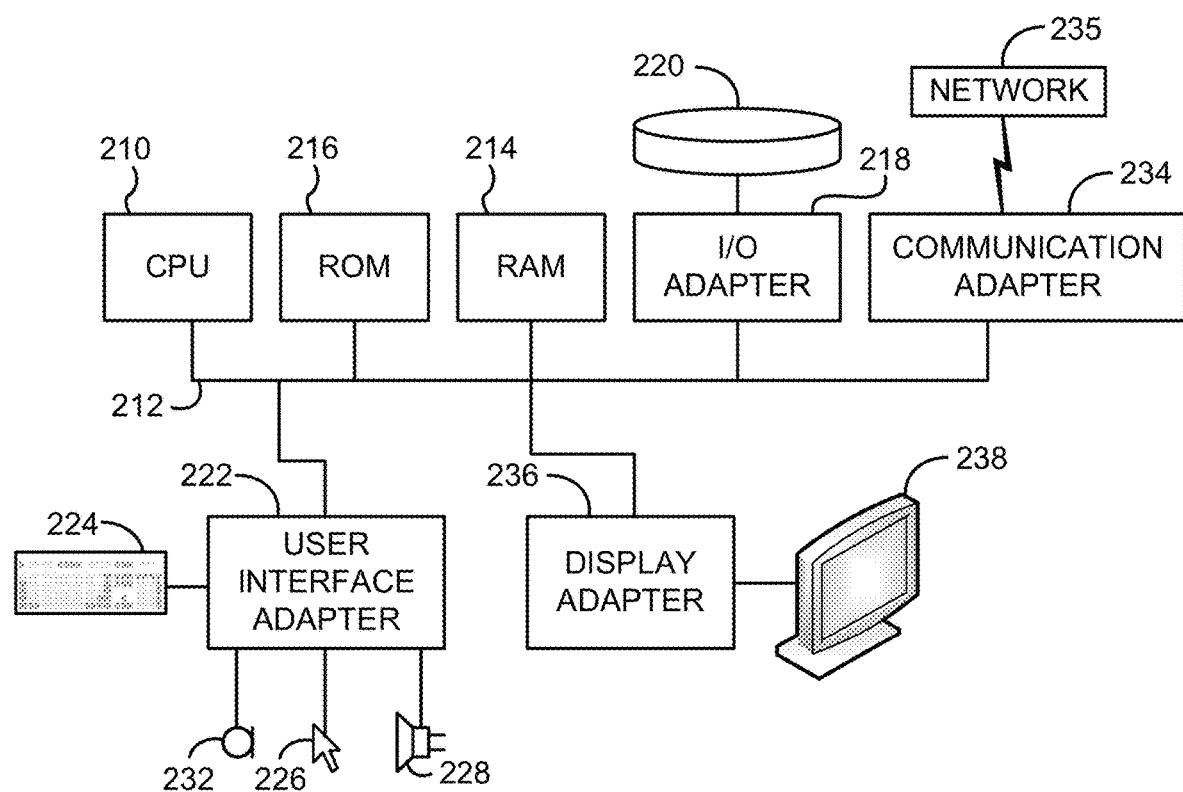
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As noted above, success of a software product depends on many factors, such as business need, user requirements, current and future market trends, etc. Any software development takes time to complete, and there is always a risk that some portion of the software might become obsolete before completion. Therefore, any way to accelerate the development timeline would be very beneficial to software developers.

Various embodiments of the present invention provide a methodology for creating a single visual representation that represents a number of factors that may influence a decision and/or status in a single view. By presenting many, and potentially all, of such factors in a single visual representation, various approaches described herein provide a more complete overview of the development process than was heretofore available. This in turn enables developers to make better decisions by considering the plethora of factors presented in the visual representation, as well as their respective dimensions and relationships relative to one another. Moreover, in some aspects, the depth of the data visualizations is selectable, where the depth refers to the details to show in the data visualizations.

In addition, the amount of data created in association with a software development process has grown exponentially over the past few years, and is expected to continue to grow in a similar manner as time goes on. The methodology presented herein provides a way to manage the ever-increasing amount of data by selecting relevant data for transformation into a visual output in a single visual representation.

Moreover, the methodology presented herein is dynamic. For instance, the data visualizations are created based on the data itself, rather than based on a fixed, predefined setting. Accordingly, when there is a new need, e.g., to represent data in a different way, rather than change a setting and redo through an entire charting cycle, dynamicity of the chart can present the visualization of the data during the run time itself in some embodiments.

Additionally, various embodiments apply learning in the system itself, thereby enabling such things as identifying and interpreting the parameters that can influence a decision, or that that are believed to best represent a particular domain.

Figure 3:
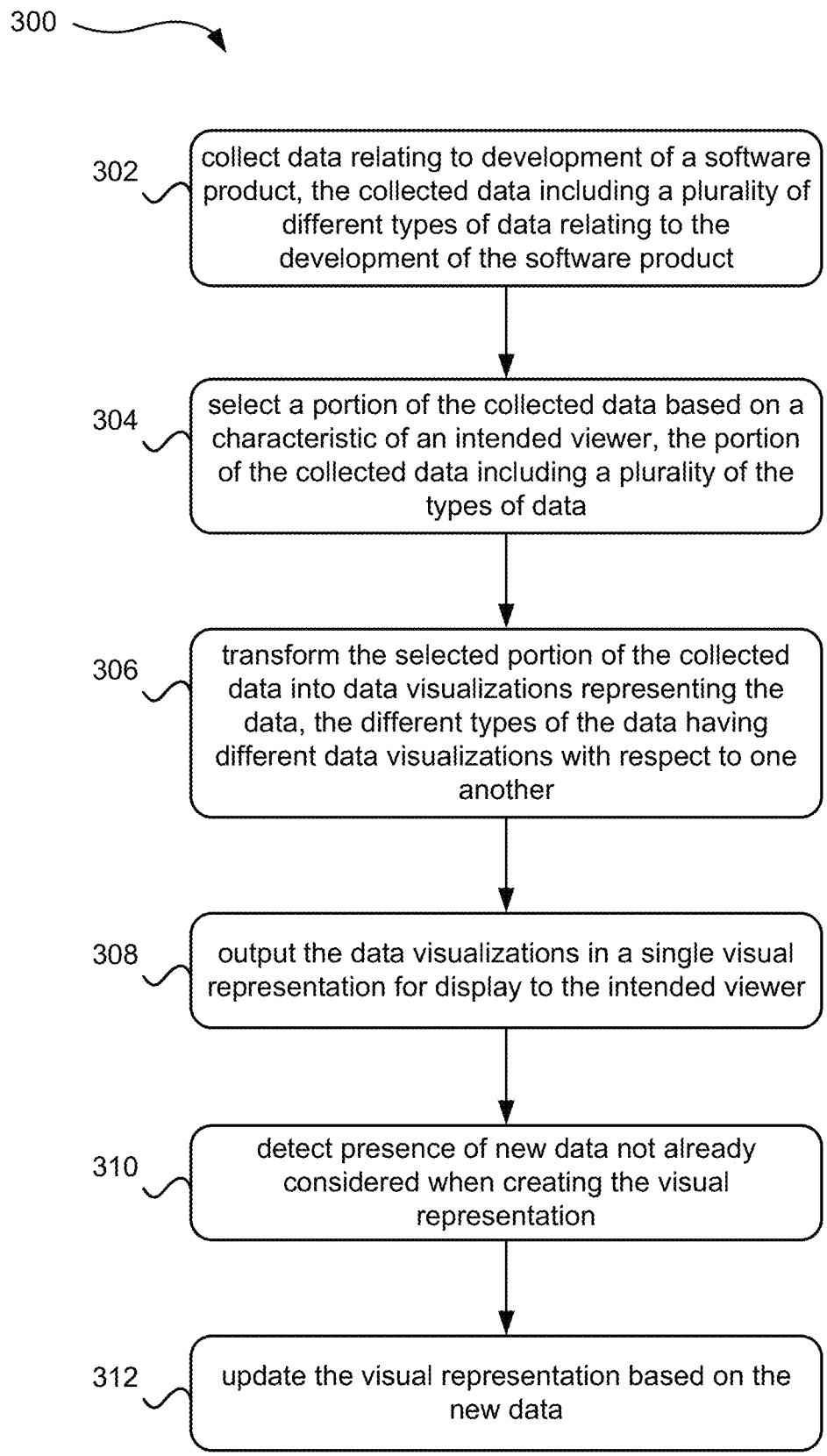
FIG. 3 is a flowchart of a method, in accordance with one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where data relating to development of a software product is collected. The collected data includes a plurality of different types of data relating to the development of the software product. The data may be any type of data that would become apparent to one skilled in the art upon reading the present disclosure. Exemplary data includes documents, program code, subroutines, progress reports, etc.

In operation 304, a portion of the collected data is selected based on a characteristic of an intended user. The portion of the collected data may include data of multiple different types. For example, if the characteristic of the intended user is computer-related, the selected data may include data pertaining to CPU and data pertaining to memory. If the characteristic of the intended user is finance-related, data pertaining to the financial domain and data pertaining to a retail domain may be selected.

In operation 306, the selected portion of the collected data is transformed into data visualizations representing the data. Different data visualizations are created for different types of data, thereby being readily visually distinguishable. For example, one type of data may have a differently shaped visualization than another type of data, e.g., one type of data is visualized using a bar, while another type of data is visualized using a line. Using the examples above, the different types of data are given different visualizations, e.g., data pertaining to the financial domain is visualized in bars and data pertaining to a retail domain is visualized in lines.

Preferably, the selected portion of the collected data is transformed into data visualizations representing the data using artificial intelligence (AI) of known type, but adapted according to the teachings herein.

Similarly, the selected portion of the collected data is transformed into data visualizations representing the data using machine learning (ML) techniques, adapted according to the teachings herein.

In operation 308, the data visualizations are output in a single visual representation for display to the intended user (the intended viewer of the visual representation).

In some embodiments, the method 300 of FIG. 3 improves operation of the computer and/or system performing the method 300 by creating a single visual representation, thereby avoiding the need to have multiple programs running each with their own window. This in turn reduces memory consumption, required processing power, etc.

Moreover, Applicants note that generation of visualizations from many sources and presentation of the same in a single visual representation according to the method 300 is not a trivial task that can be performed in the mind, but rather, as exemplified by the complexity of the methodology and architectures presented herein, is quite difficult and involves use of many computing resources to gather and process the requisite information and create the single visual representation.

Figure 4:
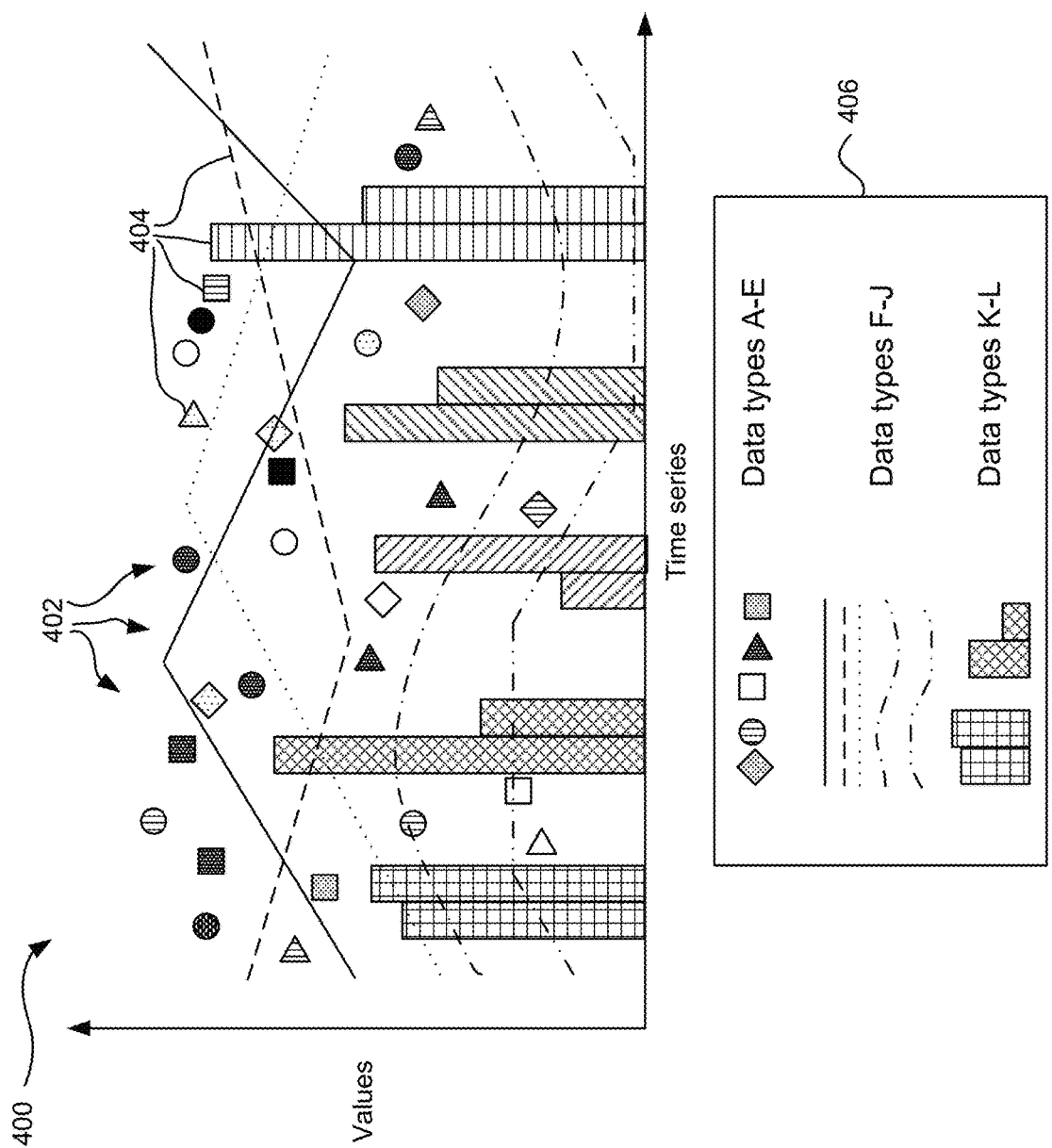
FIG. 4 is a depiction of an illustrative single visual representation, in accordance with one embodiment.

FIG. 4 shows an illustrative single visual representation 400, in accordance with one embodiment. The single visual representation 400 may be created in accordance with the present invention in any of the environments depicted in FIGS. 1-3, among others, in various embodiments. Of course, more or fewer visualizations than those specifically described in FIG. 4 may be included in the single visual representation 400, as would be understood by one of skill in the art upon reading the present descriptions.

As shown, the single visual representation 400 includes visualizations 402 of many types of data, each type of data being represented by a visualization 402 that has different features 404 than the others, thereby enabling a user to distinguish the various types of data based on recognizing said features 404. The features 404 may have any characteristic that enables visual discernment between visualizations 402. Illustrative features 404 include, but are not limited to, shapes, lines, bars, line type (e.g., solid, dashed, thickness, etc.), colors, and fill (e.g., cross hatching, solid, empty, etc.), etc.

The x and y axes of the single visual representation 400 may represent any desired parameters. Shown here are time along the x axis, and values along the y axis. The relative positions of the visualizations 402 may represent any desirable attributes, such as occurrence in time, expected occurrence in time, etc. Moreover, the dimensions of the visualizations 402 and/or features 404 thereof may represent values or other characteristics of the underlying data.

The axes presented in the single visual representation 400 may be selected based on characteristics of the user. Thus, the axes for one user may be different than those presented to another user.

A key 406 correlating the data to the visualizations 402 and/or features 404 may be presented.

The single visual representation in this and other embodiments is preferably updated in response to some condition. For example, the visual representation may be updated periodically, after expiration of a predefined period of time since creation thereof, upon receiving a request to refresh and/or update the visual representation, upon detecting a change in existing data, upon detecting new data, etc. Referring again to FIG. 3, in one approach, the visual representation may be updated based on detecting presence of new data not already considered when creating the visual representation. Thus, as shown in FIG. 3, operation 310 includes detecting the presence of such new data, while operation 312 includes updating the visual representation based on the new data. This feature permits, for example, updating the visual representation in real time so that the user is kept up to date on the latest development progress and events. In one approach, operation 312 may include performing operations similar to operations 306 and 308 for only the new data and overlying the visualizations thereof on the visual representation. In another approach, operation 312 may include performing operations similar to operations 306 and 308 for all of the data reflected in the visual representation. Preferably, the new data is transformed into a data visualization that is of a different type than any of the other data visualizations present in the single visual representation.

Preferably, AI is used to perform the updating. Thus, for example, upon detecting new data, the AI may assign a visualization to the new data and add it to the single visual representation, without any human intervention. Similarly, the AI may update the visualization if there a change in the underlying data is detected.

The single visual representation may also be modifiable, e.g., to allow some amount of personalization by the user. Any visualization and/or feature may be modifiable, according to various aspects. For example, in response to receiving a request to change the type of visual output of one of the data inputs to a different type, the visual output for the data input may be changed to the different type, e.g., from bars to lines.

Similarly, the user may be allowed to add and/or remove visualizations and/or features thereof.

In preferred embodiments, the data visualizations selected for output in the single visual representation are selected based upon the user, and thus different visual representations are output for different users. For example, the same data may be represented in the respective visual representations for various users, but with different data visualizations particular to the user for which the particular visual representation was prepared. In another example, each user is presented with visualizations of data selected just for that particular user, and thus one user may see visualizations for data that is not represented on the visual representation of another user. This feature may be part of operation 306 of FIG. 3.

Figure 5:
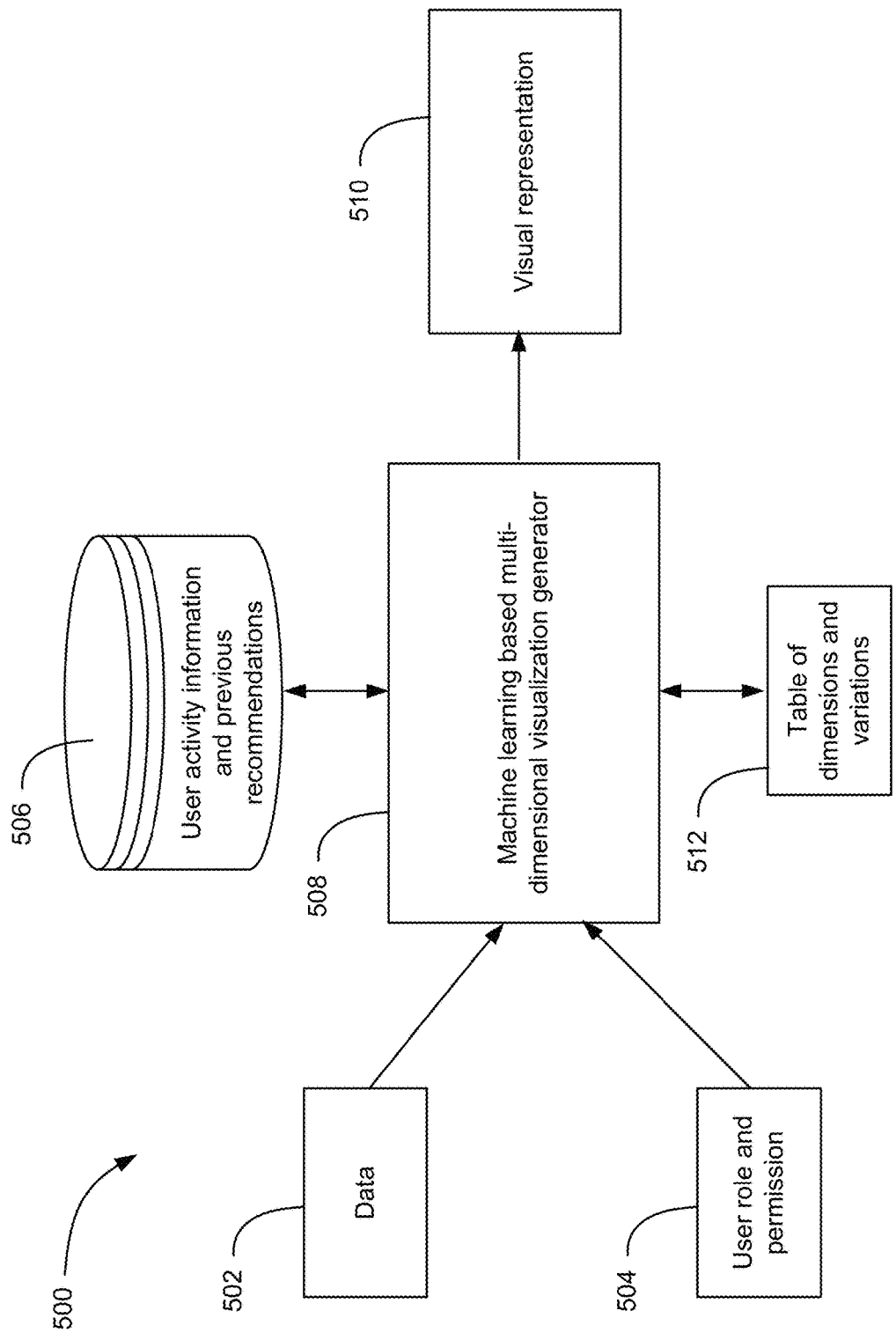
FIG. 5 is a graphical representation of an architecture of a system for creating a single visual representation of multiple types of data, in accordance with one embodiment.

Now referring to FIG. 5, a representation of an architecture 500 of a system for creating a single visual representation of multiple types of data is shown according to one embodiment. The architecture 500 may be implemented in accordance with the present invention in any of the environments depicted in FIGS. 1-4, among others, in various embodiments. Of course, more or fewer operations, components, data sources, and outputs than those specifically described in FIG. 5 may be included, as would be understood by one of skill in the art upon reading the present descriptions.

Various components of the architecture 500 of FIG. 5 may be performed by any suitable component of the operating environment. For example, in various embodiments, the architecture 500 may be partially or entirely implemented in a computer, or some other device having one or more processors therein. The processor, e.g., processing circuit(s), chip(s), and/or module(s) implemented in hardware and/or software, and preferably having at least one hardware component may be utilized in any device to perform one or more steps depicted in FIG. 5. Illustrative processors include, but are not limited to, a central processing unit (CPU), an application specific integrated circuit (ASIC), a field programmable gate array (FPGA), etc., combinations thereof, or any other suitable computing device known in the art.

With continued reference to FIG. 5, data is collected from multiple sources, and is stored in one or more databases at module 502.

Similarly, information about the permissions and/or roles of various users are stored in module 504. The roles can be used to select which data to present to which user, because typically, not everyone is interested in the same data. For example, a support team may want a very minute level of information, e.g., to allow them to determine what the incident was, whether a change created the problem, when the problem occurred, who was involved, etc. Other users may want a higher level of view with less details, e.g., details providing an overview of various sub-processes in the software development process. Likewise, data to portray on the single visual representation may be selected based on permissions of the user, e.g., so as to avoid presentation of data that the user is not authorized to see. Moreover, how to visualize the data may be selected based on user permission and/or role.

In addition, which data to visualize for a particular user, and/or how to visualize data, may be based at least in part on previous activities and/or previous occurrences, which may be stored in module 506. For example, such parameters may include previous user activity, previous recommendations (from any source), etc. Thus, for instance, the next time the user logs in, the content and/or visualizations presented in the single visual representation may be presented in a different way that is based on user's previous interactions with the single visual representation and/or the software development process.

Information from modules 502, 504 and 506 are considered in module 508 to create the single visual representation 510.

The visualizations shown in the visual representation 510 may be generated based on a set of parameters, such as one or more of the parameters depicted in the table 512. See FIG. 6. The parameters generally define the multi-dimensional aspect for the visualizations. Looking to the exemplary table 512, in row 1, the dimension is a line type, and the variations specify different line types, e.g., continuous, dashed, dotted, etc. Other dimensions are also listed, along with corresponding variations. The number of dimension and variations may be higher and/or lower than the number shown in this example.

A dimension and variation may be assigned to particular types of data, to each of the visualizations to be shown on the visual representation, etc. Thus, for example, data sets for a critical process may be assigned a solid line (e.g., variation 1), while minor parts thereof may be assigned dashed lines (e.g., variations 2-5). The characteristics of each line such as color, thickness, etc. are specified by the dimensions. The different dimensions for a given visualization provide more visibility and in depth data knowledge to the user.

In another approach, each variation corresponds to a given type of data. For example, assume the critical process from the previous example is assigned to variation 1. Then, the critical process may be assigned the line type, color, and thickness dimensions, while the minor data sets are assigned to other dimensions such as shaped, bars, etc.

The table may be prepopulated, taken from a database, generated based on the data from module 502, generated for a specific user so as to reflect user preferences, etc.

The impactfulness and computation of the dimension are also represented in the table 512, where H=high, M=medium, and L=low. The impactfulness may represent an estimation of impact of the dimension on a user. Thus, dimensions with high impactfulness may be shown in the visualization, while dimensions with medium or low impactfulness may or may not be shown. In another approach, a high impactfulness may be assigned to dimensions that are important to the particular user, while low impactfulness may be assigned to dimensions that are not important to the user so as to enhance the information the user is interested in and downplay the data the user is not interested in.

Again, the dimensions and/or variations generated and/or selected for one user may be different than those of another user. Thus, a unique visual representation may be generated for each particular user, preferably based on information from modules 504 and 506.

Figure 7:
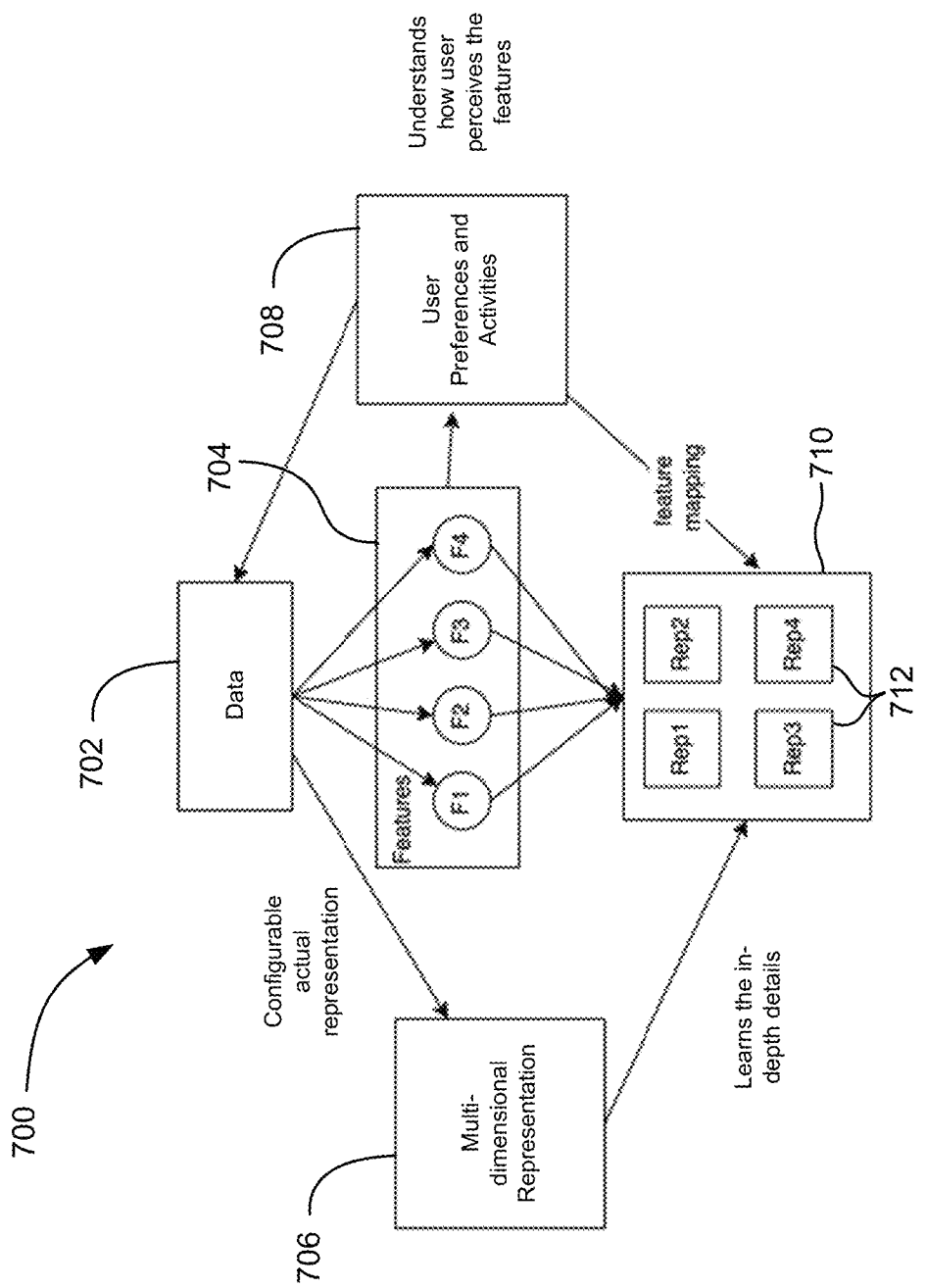
FIG. 7 is a graphical representation of an architecture of a system for understanding multiple types of data and features thereof, in accordance with one embodiment.

Now referring to FIG. 7, a representation of an architecture 700 of a system for understanding multiple types of data and features thereof is shown according to one embodiment. The architecture 700 may be implemented in accordance with the present invention in any of the environments depicted in FIGS. 1-6, among others, in various embodiments. Of course, more or fewer operations, components, data sources, and outputs than those specifically described in FIG. 7 may be included, as would be understood by one of skill in the art upon reading the present descriptions.

Various components of the architecture 700 of FIG. 7 may be performed by any suitable component of the operating environment. For example, in various embodiments, the architecture 700 may be partially or entirely implemented in a computer, or some other device having one or more processors therein. The processor, e.g., processing circuit(s), chip(s), and/or module(s) implemented in hardware and/or software, and preferably having at least one hardware component may be utilized in any device to perform one or more steps depicted in FIG. 7. Illustrative processors include, but are not limited to, a central processing unit (CPU), an application specific integrated circuit (ASIC), a field programmable gate array (FPGA), etc., combinations thereof, or any other suitable computing device known in the art.

With continued reference to FIG. 7, data is collected from multiple sources at module 702. Every domain has different features, and the features are different for each domain. For example, data from a manufacturing domain will have different features than data from a regional domain. Moreover, the features have different meanings, depending on the user who will view the visualizations of the data. A goal of this exemplary architecture 700 is to understand the data and understand the different features of the data so that coherent visualizations are produced, preferably uniquely for each user in a manner that is appropriate for that user.

In module 704, features of the data are determined and collected. Preferably, AI is used to determine the features of the data.

In module 706, the configurable actual representation of the data is converted to a multidimensional representation of the data. The configurable actual representation may generally correlate with standards for the industry of interest. The multidimensional representation refers to how that data will be visualized for the user. In one embodiment, AI is used to perform the conversion.

Module 708 considers user preferences and activities, e.g., to understand how a particular user perceives the features.

Module 710 collects the information from modules 704-708 and uses that information to learn the in depth details and understand the different intent for each visualization. Module 710 also performs feature mappings and creates different varieties of representations for a particular feature. Preferably, module 710 uses AI to process the information.

Thus, a single feature may have many different representations 712 based on the multi-dimensional view.

Figure 8:
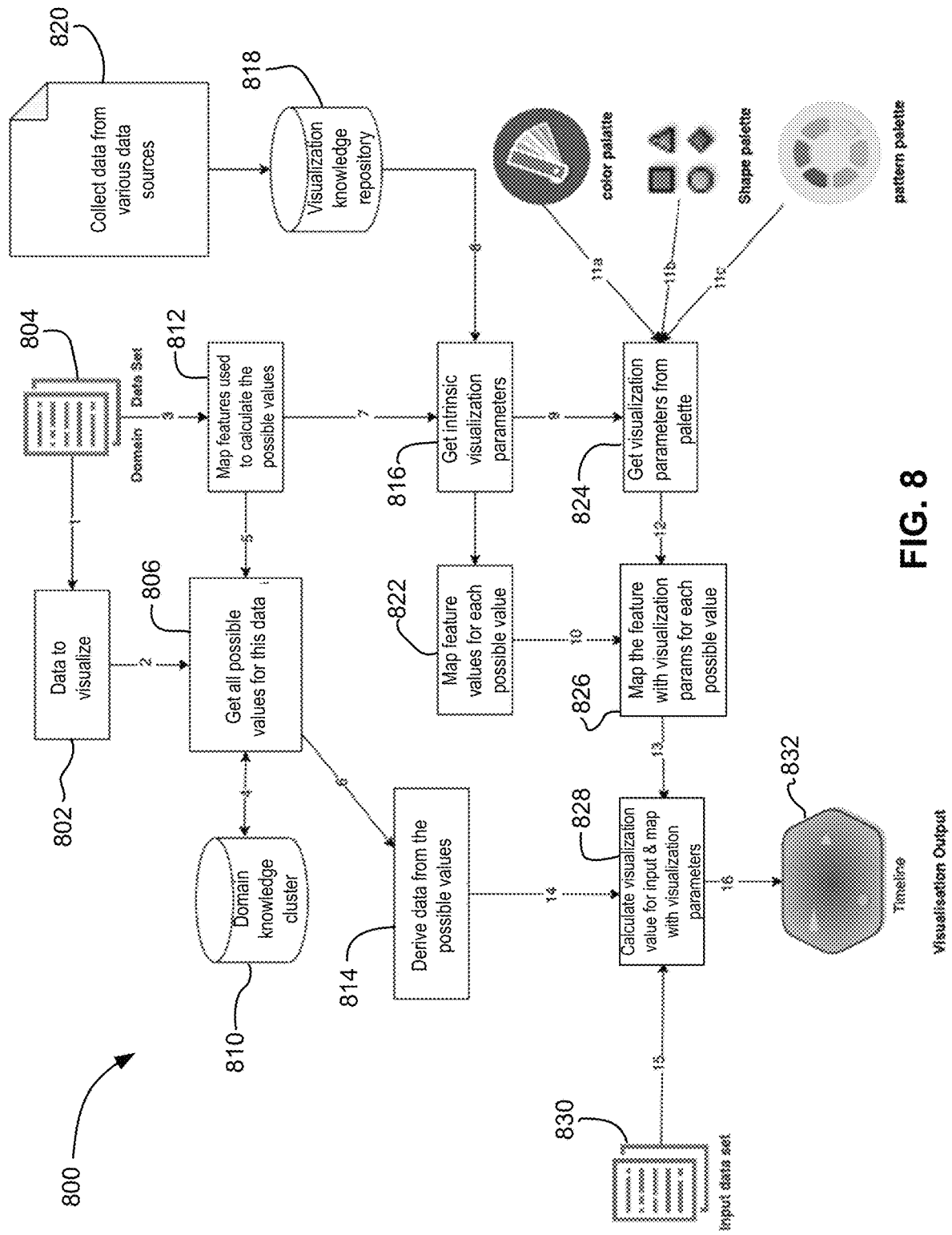
FIG. 8 is a graphical representation of an architecture of a system for performing a method for creating a data visualization, in accordance with one embodiment.

Now referring to FIG. 8, a system 800 for performing a method for creating a data visualization is shown according to one embodiment. The method may be performed in accordance with the present invention in any of the environments depicted in FIGS. 1-7, among others, in various embodiments. Of course, more or fewer modules than those specifically described in FIG. 8 may be included in the system 800, as would be understood by one of skill in the art upon reading the present descriptions. Moreover, numbering from 1-16 has been included to depict a general flow of the method from module to module, though the actual sequence can vary from that shown, and/or some steps may be performed in parallel.

Each of the steps of the method performed by system 800 may be performed by any suitable component of the operating environment. For example, in various embodiments, the method may be partially or entirely performed by a computer running AI, or some other device having one or more processors therein. The processor, e.g., processing circuit(s), chip(s), and/or module(s) implemented in hardware and/or software, and preferably having at least one hardware component may be utilized in any device to perform one or more steps of the method. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, the system 800 includes module 802, where data that may be visualized is collected from a domain and data set 804. At module 806, all the possible values for this data are determined by understanding the distributions of the values of the data. Information from a domain knowledge cluster 810 may be used to provide more insights on the particular domain aspects. Also, information from module 812 is used to determine the possible values of the data. Module 812 maps the features to calculate the possible values.

The different data types are derived from the possible values at module 814. For example, some data is represented as a numeric value or numeric range, and other data is represented as a string category. Moreover, the data may be separated into different categories based on some predefined criteria defining the categories, e.g., using ML.

Now that the data is derived in module 814, the method determines how to represent the data, visually, in the domain perspective. Module 816 uses information from a visualization knowledge repository 818 to determine how to visualize the data. The visualization knowledge repository 818 may have information therein, collected by module 820, that may include such things as predefined ways to visualize certain types of information, such as analytics-industry-standard ways, user-input ways, etc. Preferably, module 820 actively collects information and visualization options for each potential type of data. In some approaches, the data may be collected from various data sources, such as documents, social media, applications, etc. reflecting how such data is visualized from the end user point of view.

Referring again to module 816, a visualization parameter is selected for each feature, e.g., a bar, a line, a shape, a color, etc.

In module 822, features values for each possible value are mapped. Preferably, all possible values are calculated for all of the data.

In module 824, visualizations for each feature are selected from one or more pallets according to the intrinsic visualization parameters.

In module 826, the visualization parameters are combined to define the visualization for each feature, value and/or data.

Module 828 determines what incoming data to visualize and how to visualize it. Particularly, module 828 receives data from an input data set 830, determines the types of that data to visualize and calculates the values of that data to visualize using information from module 814, correlates the calculated values with the value/visualization correlations from module 826, and outputs the visualizations 832.

Figure 9:
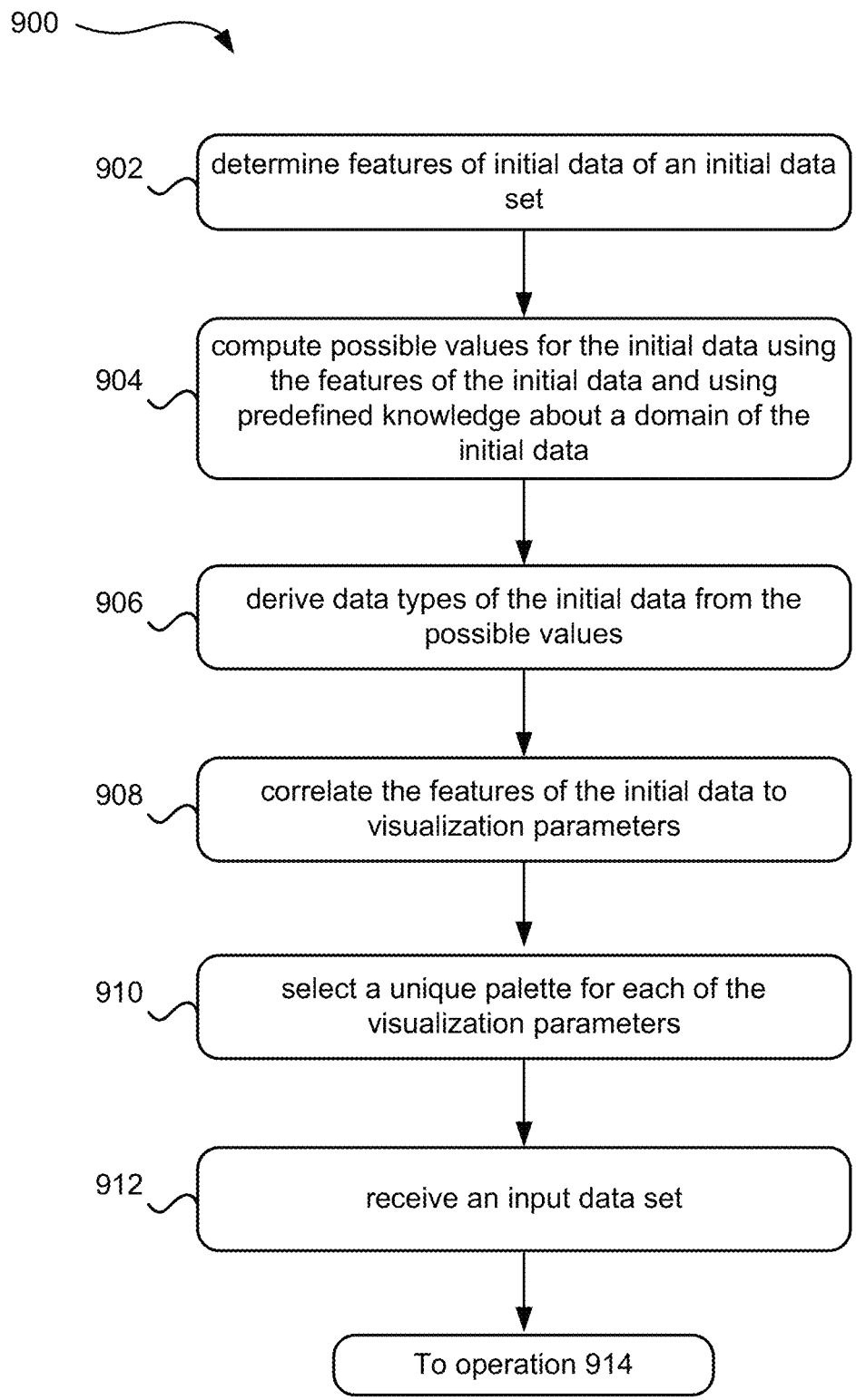
FIG. 9 is a flowchart of a method for creating a data visualization using the system of FIG. 8, in accordance with one embodiment.
Figure 9:
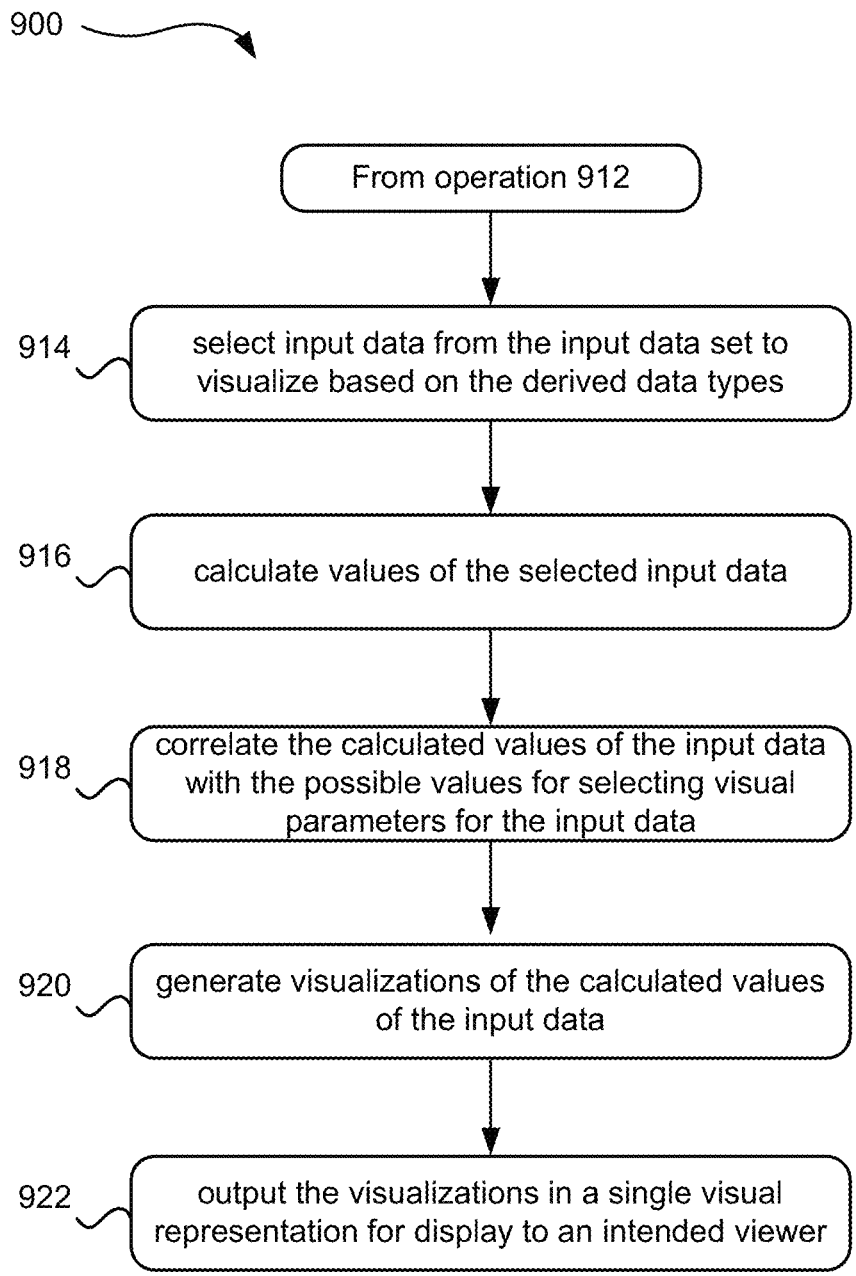

FIG. 9 depicts a method 900 for creating a data visualization using the system 800 of FIG. 8, in accordance with one embodiment. The method 900 may be performed in accordance with the present invention in any of the environments depicted in FIGS. 1-8, among others, in various embodiments. Of course, more or fewer operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where features of initial data of an initial data set are determined. See also module 802 of FIG. 8, and related description.

In operation 904, possible values for the initial data are computed using the features of the initial data and using predefined knowledge about a domain of the initial data. See also modules 806 and 812 of FIG. 8, and related description.

In operation 906, data types of the initial data are derived from the possible values. See also module 814 of FIG. 8, and related description.

In operation 908, the features of the initial data are correlated to visualization parameters. See also module 816 of FIG. 8, and related description.

In operation 910, a unique palette for each of the visualization parameters is selected. See also module 824 of FIG. 8, and related description.

In operation 912, an input data set is received. See also data set 830 of FIG. 8, and related description.

In operation 914, input data from the input data set to visualize is selected based on the derived data types. See also module 828 of FIG. 8, and related description.

In operation 916 values of the selected input data are calculated. See also module 828 of FIG. 8, and related description.

In operation 918, the calculated values of the input data are correlated with the possible values for selecting visual parameters for the input data. See also module 828 of FIG. 8, and related description.

In operation 920, generating visualizations of the calculated values of the input data. See also module 828 of FIG. 8, and related description.

In operation 922, the visualizations are output in a single visual representation for display to an intended user. See also visualization 832 of FIG. 8, and related description.

In some approaches, a mapping of values of the features for each of the possible values may be created, e.g., as in module 822 of FIG. 8. The mapping may be used to create correlations of the visualization parameters to the values of the features, and to the palettes corresponding to the visualization parameters.

In additional approaches, correlating the features of the initial data to visualization parameters may include comparing the features to information in a visualization knowledge repository having knowledge created using artificial intelligence that determines how similar features are visualized in other processes.

Figure 10:
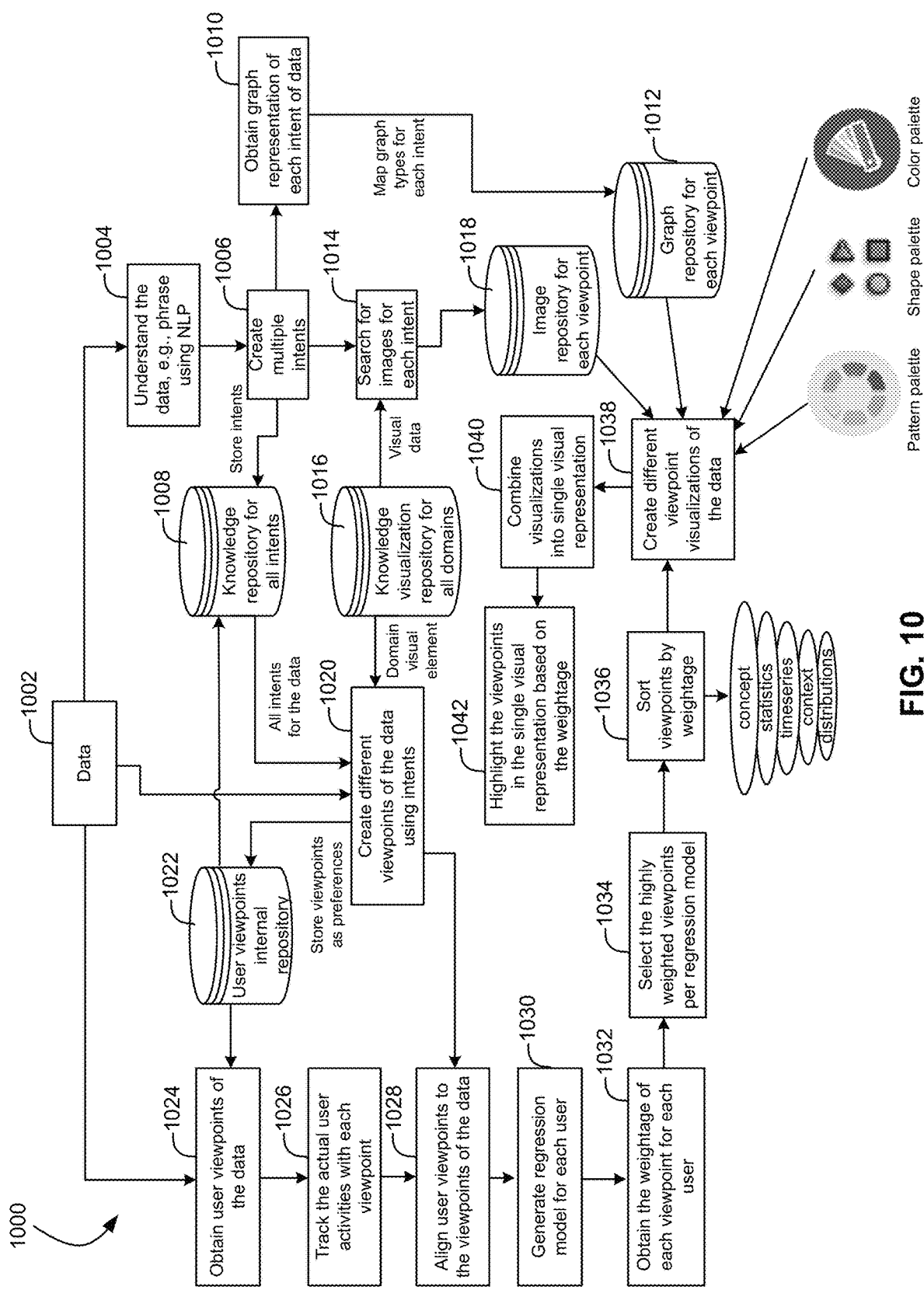
FIG. 10 is a graphical representation of an architecture of a system for performing a method for creating a data visualization, in accordance with one embodiment.

Now referring to FIG. 10, a system 1000 for performing a method for creating a data visualization is shown according to one embodiment. The method may be performed in accordance with the present invention in any of the environments depicted in FIGS. 1-9, among others, in various embodiments. Of course, more or fewer modules than those specifically described in FIG. 10 may be included in the system 1000, as would be understood by one of skill in the art upon reading the present descriptions.

Each of the modules of the system 1000 may be implemented by any suitable component of the operating environment. For example, in various embodiments, the modules and method may be partially or entirely performed by a computer running AI, or some other device having one or more processors therein. The processor, e.g., processing circuit(s), chip(s), and/or module(s) implemented in hardware and/or software, and preferably having at least one hardware component may be utilized in any device to perform one or more steps of the method. Illustrative processors include, but are not limited to, a central processing unit (CPU), an application specific integrated circuit (ASIC), a field programmable gate array (FPGA), etc., combinations thereof, or any other suitable computing device known in the art. Except as otherwise noted herein, conventional techniques may be used in any of the modules to achieve the objectives of this new method.

As shown in FIG. 10, system 1000 includes module 1002, where data relating to development of a software product is collected.

In module 1004, the data is assessed to determine features of the data, which are used to assist module 1006 in determining intents of the data. If the data includes phrases, natural language parsing (NLP) can be used to assist in such assessment.

In module 1006, multiple intents for each feature of the data are determined based on the assessment of the data. The intents generally refer to how different users perceive the data. Accordingly, if there are 20 users, each of the users will see the data a different way, and thus, a different intent for each user is created for each feature of the data, e.g., for a particular domain phrase, 20 intents corresponding to the 20 users may be created for that phrase. AI is preferably used to create, for each feature of the data, user-specific intents for the potential users. The intents are stored in a knowledge repository 1008.

Now that the features and their possible intents are determined, how to visualize the data is determined. In module 1010, the graph representation of each intent of the data is generated. Graph types are mapped for each intent (e.g., user viewpoint) and stored in a graph repository 1012. In module 1014, images are matched to each intent. Selection of the images may be based on information from a knowledge visualization repository 1016 for various domains, including the current domain being assessed. The images for each intent (e.g., user viewpoint) may be stored in an image repository 1018.

Different viewpoints of the data are created based on the intents in module 1020, and stored in a user viewpoint repository 1022. This is based on the actual and/or expected users. The users may be determined based on the organization developing the software (e.g., who are the potential users within the organization), a user list, etc.

Turning now to the user-specific side of the process, for a particular intended user, the intended user's viewpoints of the data are obtained in module 1024, e.g., retrieved from the user viewpoint repository 1022. Thus, a viewpoint for the intended user may be determined based on prior activities by the intended user. In other approaches, one or more of the viewpoints may be determined in another way, e.g., based on user input, etc.

The actual user activities may be tracked in module 1026, with user permission, e.g., to determine what this particular user is interested in. For example, the user may be interested in a particular part of the data, or particular aspects of the data. Based on the tracked activities, the user's viewpoint can be estimated and correlated with (e.g., aligned to) the viewpoints of the data in module 1028.

A regression model is generated for the intended user based on the retrieved viewpoints for the intended user and the viewpoints of the data correlated therewith. Preferably a unique regression model is created for each intended user if there are many users. See module 1030. The various viewpoints are weighted for the user in module 1032. Highly weighted viewpoints are most likely to be of interest to the user, so the highly weighted viewpoints are selected in module 1034, and sorted in operation 1036. In the example show, the user is most interested in Concept, then Statistics, Timeseries, and so on.

In module 1038, different viewpoint visualizations of the data are generated. Particularly, the collected data is transformed into data visualizations representing the data based on the correlation of the viewpoints, different types of the data having different data visualizations with respect to one another.

In modules 1040 and 1042, the data visualizations are combined into a single visual representation, and output for display to the intended user. Visualizations for viewpoints that are weighted higher based on the regression model are preferably highlighted in some way.

Figure 11:
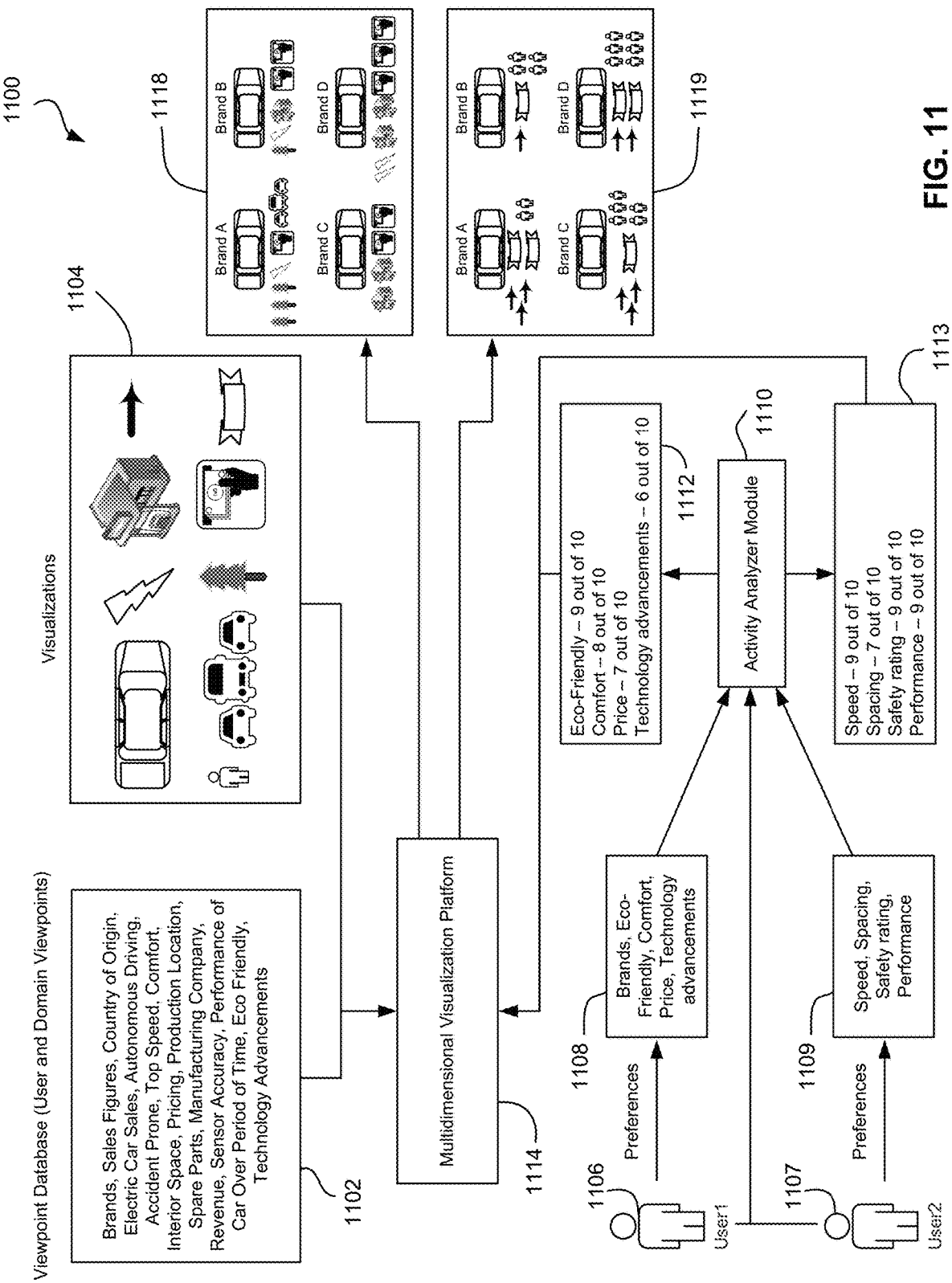
FIG. 11 is a graphical representation of a system for creating a data visualization in an automotive setting, e.g., an automotive manufacturing domain, in accordance with one embodiment.

Now referring to FIG. 11, a system 1100 for creating a data visualization in an automotive setting, e.g., an automotive manufacturing domain, in accordance with one embodiment. The method may be performed in accordance with the present invention in any of the environments depicted in FIGS. 1-10 and 12-18, among others, in various embodiments. Of course, more or fewer modules than those specifically described in FIG. 11 may be included in the system 1100, as would be understood by one of skill in the art upon reading the present descriptions.

Each of the modules of the system 1100 may be implemented by any suitable component of the operating environment. For example, in various embodiments, the modules and method may be partially or entirely performed by a computer running AI, or some other device having one or more processors therein. The processor, e.g., processing circuit(s), chip(s), and/or module(s) implemented in hardware and/or software, and preferably having at least one hardware component may be utilized in any device to perform one or more steps of the method. Illustrative processors include, but are not limited to, a central processing unit (CPU), an application specific integrated circuit (ASIC), a field programmable gate array (FPGA), etc., combinations thereof, or any other suitable computing device known in the art. Except as otherwise noted herein, conventional techniques may be used in any of the modules to achieve the objectives of this new method.

A viewpoint database 1102 includes all known viewpoints for a user and/or a domain. The viewpoints may be created using known techniques, retrieved from a repository (e.g., 1022 of FIG. 10), etc. A visualizations repository 1104 includes a collection of visualizations that are relevant to automobiles. The visualizations are also pre-associated with the viewpoints in the viewpoint database 1102, e.g., using techniques presented above. The visualizations may be obtained in any desired manner. See, e.g., 818-820 of FIG. 8 and related description for one example.

Preferences of a first user 1106 are stored in a preferences database 1108. Similarly, preferences of a second user 1107 are stored in a second preferences database 1109 corresponding to the second user 1107. These preferences may be selected by the respective user, may be a default list of general preferences, etc. An activity analyzer module 1110 monitors user activity, e.g., web browsing, answering survey questions, etc. as well as considers the preferences listed in the preferences database 1108, 1109 and any information appurtenant thereto to determine and rank the preferences 1112, 1113 of the respective user as it pertains to automobiles. The activity analyzer module 1110 may use a model, which has been trained using known techniques and/or learns over time from monitoring user activity, to determine and rank the preferences of the user. At least the top preferences 1112, 1113 and their rankings are output to the multidimensional visualization platform 1114, which correlates the preferences and their rankings to viewpoints from the viewpoint database. The most relevant viewpoints to the respective user's preferences may be selected, e.g., based on the rankings of the preferences. The visualizations pre-associated with the selected viewpoints are retrieved from the visualizations repository 1104. The multidimensional visualization platform 1114 generates a single visual representation 1118 for the first user 1106 having the retrieved visualizations presented in a manner that reflects the first user's preferences and their rankings. The multidimensional visualization platform 1114 also generates a single visual representation 1119 for the second user 1107 having the retrieved visualizations presented in a manner that reflects the second user's preferences and their rankings. In the example shown, eco-friendliness is the highest ranked preference for the first user 1106, so the tree representing eco-friendliness is provided near each car that is eco-friendly, in a number of trees that represents the relative eco-friendliness of the automobiles relative to one another. Similarly, technology, represented by the lightning bolt, has the lowest ranking, resulting in Brand D being shown in the bottom right position with two lightning bolt visualizations in the representation 1118 pertaining to the first user 1106.

FIGS. 12-17 depict an illustrative architecture 1200 for using AI to create a data visualization, in accordance with one embodiment. Various modules of the architecture 1200 may be used in accordance with the present invention in any of the environments depicted in FIGS. 1-11, among others, in various embodiments. Of course, more or fewer operations than those specifically described in FIG. 12 may be included in architecture 1200, as would be understood by one of skill in the art upon reading the present descriptions.

Each of the steps of the methodology performed in the modules of the architecture 1200 may be performed by any suitable component of the operating environment. For example, in various embodiments, the methodology may be partially or entirely performed by a computer, or some other device having one or more processors therein. The processor, e.g., processing circuit(s), chip(s), and/or module(s) implemented in hardware and/or software, and preferably having at least one hardware component may be utilized in any device to implement any of the modules. Illustrative processors include, but are not limited to, a central processing unit (CPU), an application specific integrated circuit (ASIC), a field programmable gate array (FPGA), etc., combinations thereof, or any other suitable computing device known in the art.

Figure 12:
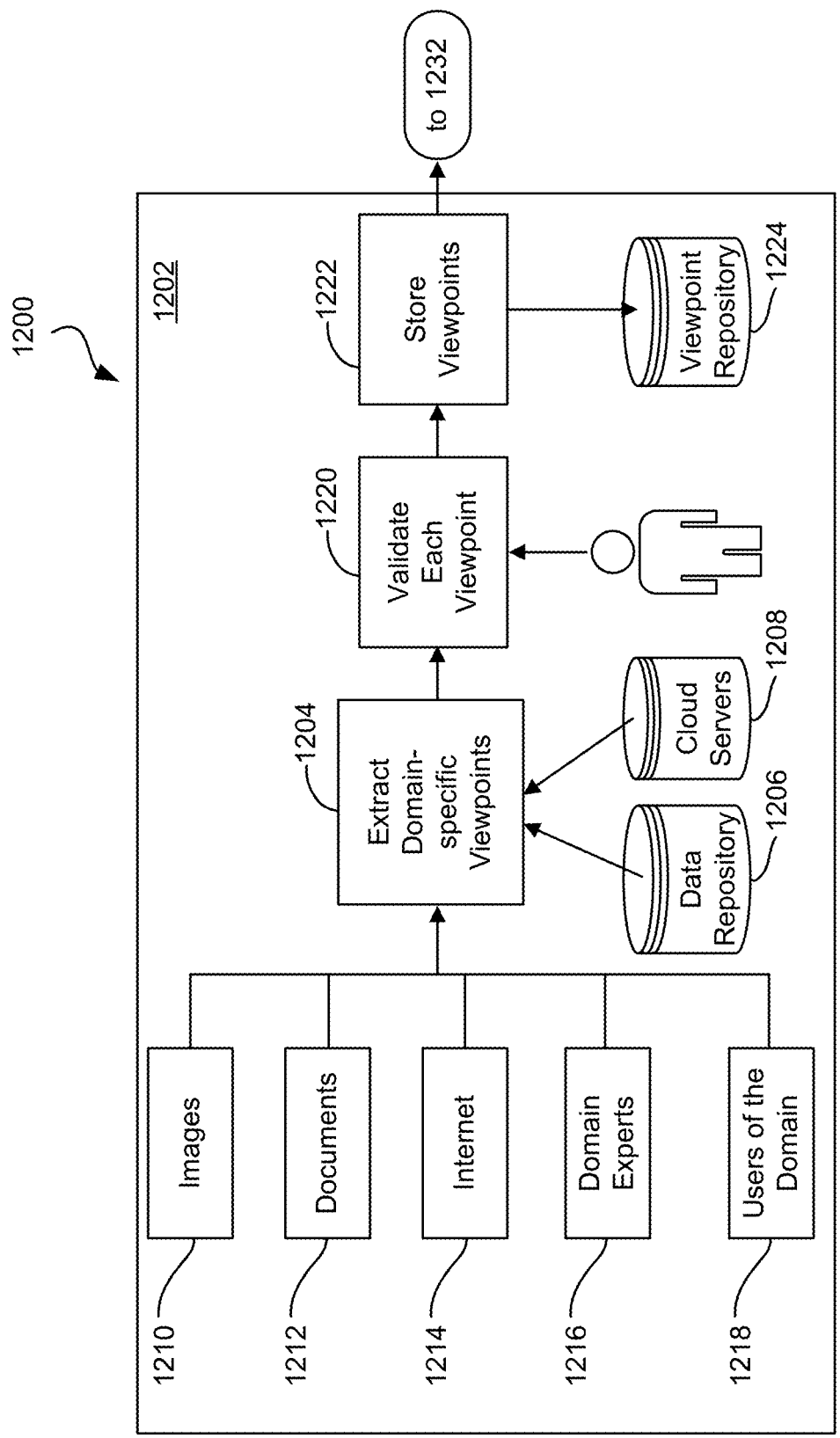
FIGS. 12-17 depict an illustrative architecture for using AI to create a data visualization, in accordance with one embodiment.

Referring to FIG. 12, a viewpoints module 1202 is used to create viewpoints for each user, e.g., the users of FIG. 11. The viewpoints module 1202 includes a domain extraction submodule 1204 that extracts domain specific viewpoints from various sources, such as data repositories 1206, cloud servers 1208, etc. The domain extraction submodule 1204 may use any technique presented herein to create the viewpoints, including natural language processing, image recognition, etc. The domain extraction submodule 1204 may be trained using selected training data such as images 1210, documents 1212, information from the internet 1214, training data created by domain experts 1216, and from information received from users of the domain 1218. The viewpoints are validated using a viewpoint validation submodule 1220, preferably with input from a user, ideally a domain expert. The viewpoint storage submodule 1222 stores the viewpoints, e.g., in a viewpoints database 1224.

Figure 13:
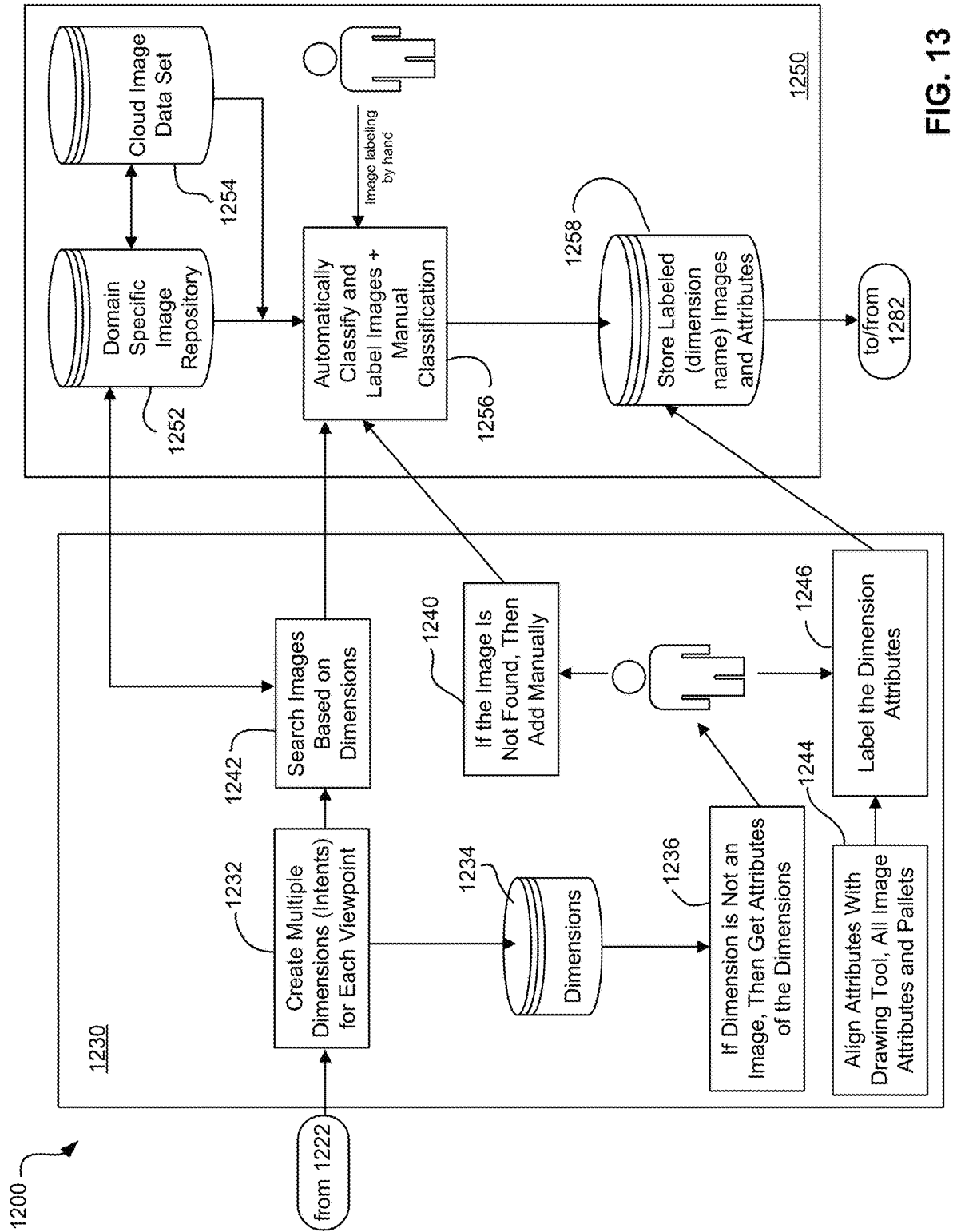

Referring to FIG. 13, a labeling dimensions module 1230 and a train and label module 1250 work together to create labeled images.

The labeling dimensions module 1230 includes an intents submodule 1232 that creates multiple dimensions (intents) for a viewpoint, e.g., a viewpoint received from submodule 1222 of FIG. 12. The intents submodule 1232 may use a natural language classifier to analyze and understand the intent of the viewpoint. The dimensions may be stored in a database 1234.

Figure 18:
FIG. 18 depicts a table of illustrative dimensions for various viewpoints associated with an automobile-centric embodiment.

FIG. 18, discussed in more detail below, depicts a table 1800 of illustrative dimensions for various viewpoints.

If a dimension is not an image, submodule 1236 attempts to determine attributes of the dimension, such as a range, intensity, size, etc. The attributes are presented to a user or another submodule 1240 for selection of an image corresponding to the attributes. If an image is not available, image data added manually by a user, e.g., a data analyst, may be received.

An images submodule 1242 searches images based on the dimensions (intents) created by the intents submodule 1232. Images may be retrieved from a domain specific image repository 1252 or any other source.

In submodule 1244, attributes of the images such as color, palette, etc. are determined, e.g., via a drawing tool. Attributes of the dimensions are labeled in submodule 1246, e.g., automatically, with the help of a user, etc.

The train and label module 1250 includes the aforementioned domain specific image repository 1252, as well as a cloud image data set repository 1254. The repositories 1252, 1254 may be in communication with each other, e.g., to share images and related data. An image classification submodule 1256 classifies and labels images received from submodules 1240 and 1242 as well as repositories 1252 and 1254 using any known technique. The image labels, for example, may include the name of the dimension corresponding to the image. Manual classification may also be used, e.g., such as where results of automated classification are below a predefined confidence threshold. The labeled images from submodule 1256, along with the corresponding attributes of the images and dimensions from submodules 1244 and 1246, are stored in a labeled image database 1258. The labeled images, image attributes and dimension attributes are used later, as discussed below.

Figure 14:
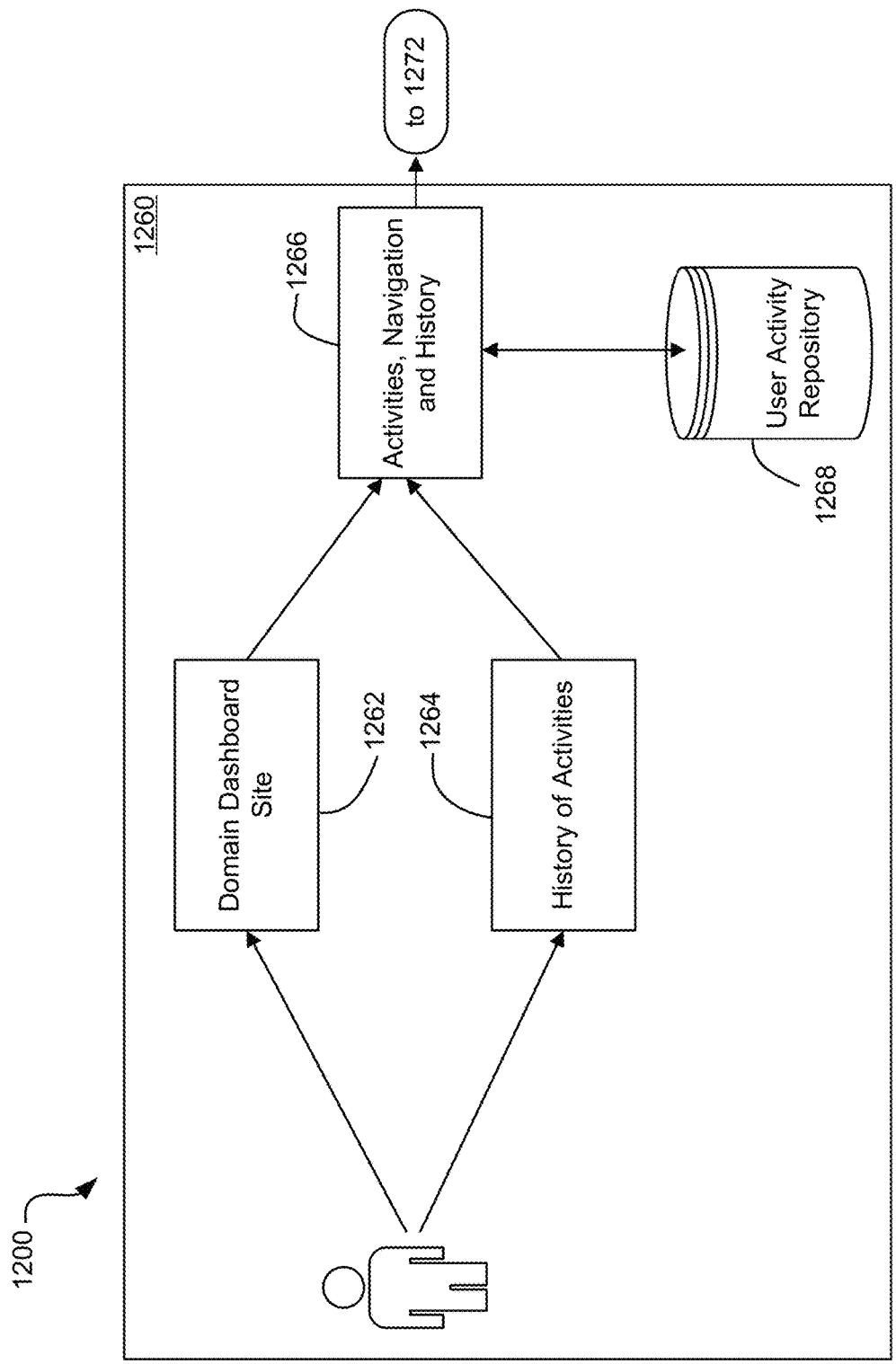

Referring to FIG. 14, a user activity learning module 1260 includes a domain dashboard submodule 1262 that provides a domain dashboard site for receiving information from a user, e.g., for monitoring activities and navigation of the user. A history submodule 1264 collects a history of activities of the user. The activities, navigation information and history may be stored by submodule 1266 in a user activity repository 1268.

Figure 15:
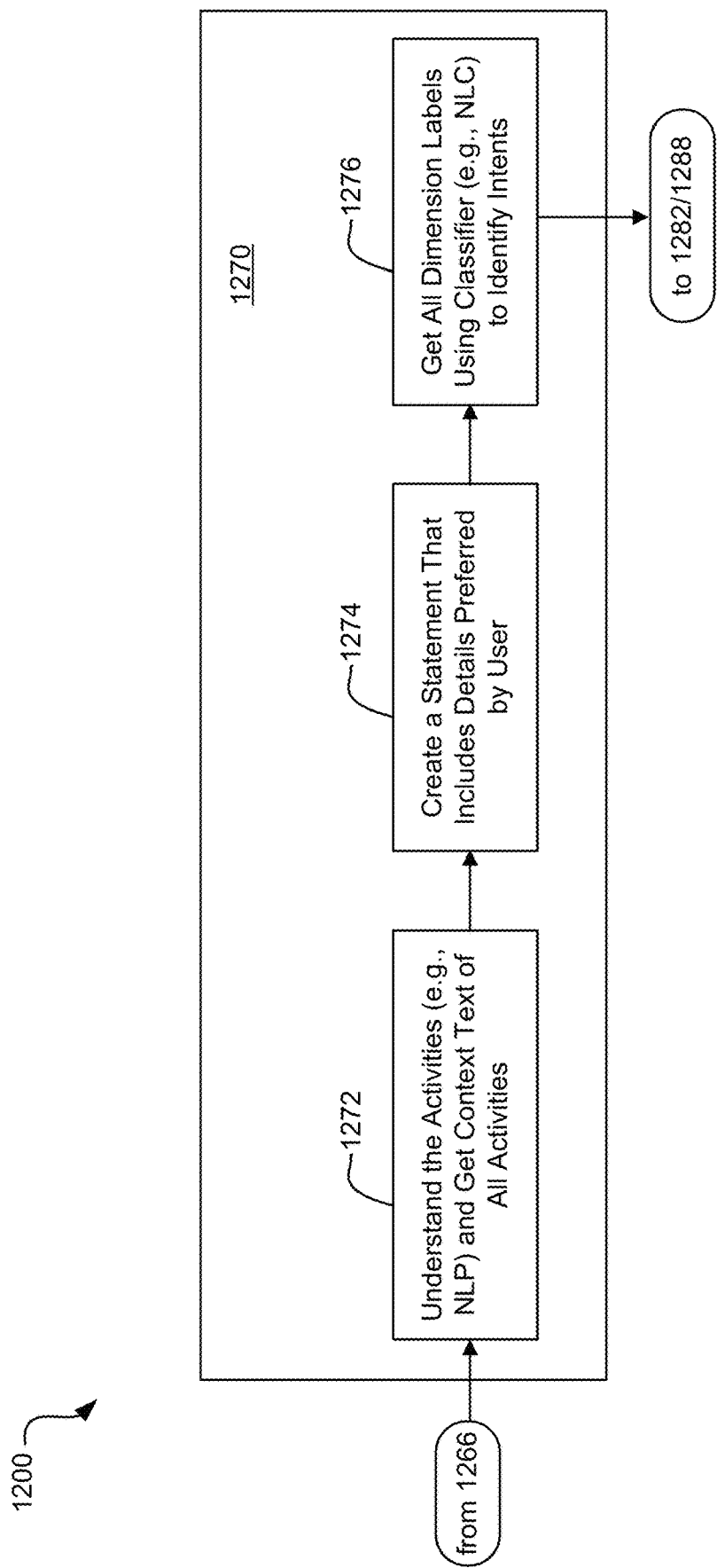

FIG. 15 depicts a user preference modification module 1270 that includes a context submodule 1272 that receives input from submodule 1266 of FIG. 14, and processes that input to understand the activity of the user. In one approach, natural language processing is used to analyze the contextual text of the user's activities, navigation and history. Preference submodule 1274 creates a preferably textual statement that contains details about the user preferences. A classification submodule 1276 determines dimension (intent) labels from the statement, preferably using a natural language classifier or other known classifier. The classification submodule 1276 preferably lists the users intents based on an estimated user priority. See, e.g., activity analyzer module 1110 of FIG. 11. Higher priority intent dimensions may be listed first.

Figure 16:
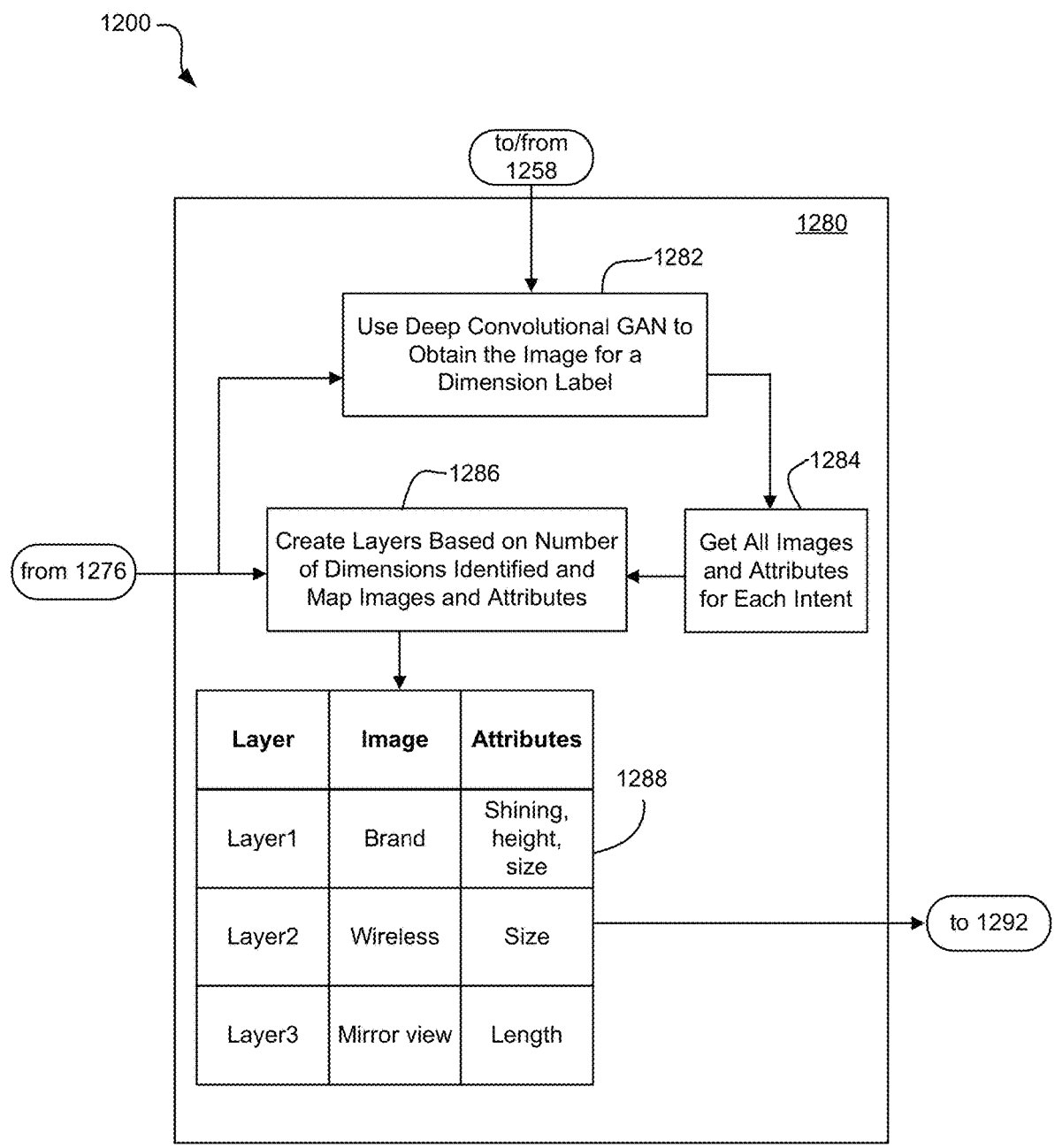

FIG. 16 depicts a layering and chart creation module 1280. One or more images corresponding to a dimension label are selected in a matching submodule 1282. For example, labels from module 1270 are matched to labeled images from the labeled image database 1258 shown in FIG. 13, using known techniques. Preferably, a deep convolutional generative adversarial network (GAN) is used to match the best labeled image to the label from module 1270. The images and attributes for each intent are gathered by submodule 1284.

A layering submodule 1286 creates layers based on the number of dimensions identified in module 1270 as well as the images and attributes from submodule 1284, and maps the images and attributes to those layers. The mapping is stored in a mapping repository 1288.

Figure 17:
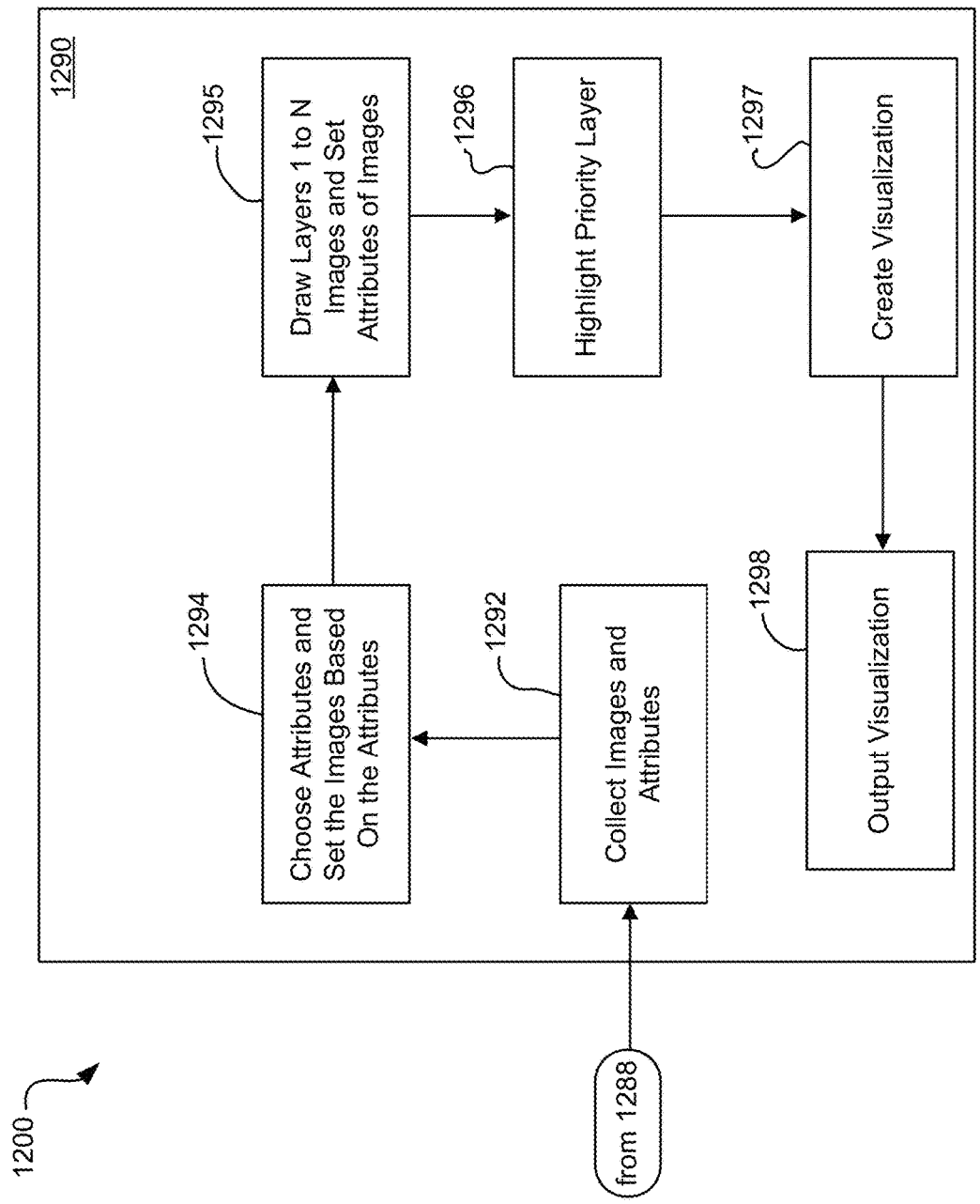

Referring to FIG. 17, a draw and display module 1290 includes a collection submodule 1292 that collects the images and attributes. A selection submodule 1294 chooses the proper attributes, such as height, width, color, etc. and sets the images based on those attributes. In submodule 1295, layers are drawn with corresponding images, and the image attributes are set. Highlighting submodule 1296 selects and highlights the image corresponding to a higher priority layer or layers, e.g., as correlated with the priority of intents from submodule 1276 of FIG. 15. For example, the image of a more important layer may be highlighted more than the images of other less important layers. Submodule 1297 creates some or all possible combinations of the images to create a single visualization, which is output by submodule 1298.

FIG. 18 depicts a table of illustrative dimensions for various viewpoints associated with an automobile-centric embodiment. The dimensions can be used to select pictures and/or to alter the properties of pictures or shapes. Accordingly, the system 1100 of FIG. 11, when implemented according to the architecture 1200 of FIGS. 12-17, may use such a table 1800 to select images for the single visual representations.

The foregoing methodologies, while rooted in graphical output processing, data transformation, and/or AI/ML, improve the technical field of software development by presenting a single visual representation having visualizations of many types of data in one image. This single view allows the user to make better decisions, avoid errors, and predict with more certainty the end of the software development process.

The foregoing methodologies, while rooted in graphical output processing, also improve the technical field of software development, as well as operation of the computers that ultimately run the developed software. For example, the methodologies improve the efficiency of software development processes and the corresponding systems implementing the software development processes due to the aforementioned benefits. Moreover, the foregoing methodologies improve the efficiency and/or performance of the machines that ultimately run the software developed by the software development processes, because the software developed is of higher quality due to the improved decision making during the software development processes, as enabled by the foregoing methodologies.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    collecting data relating to development of a software product, the collected data including a plurality of different types of data relating to the development of the software product;
    selecting a portion of the collected data based on a characteristic of an intended user, the portion of the collected data including a plurality of the types of data;
    inputting to a machine learning module the selected portion of the collected data-, the machine learning module transforming the selected portion of the collected data into data visualizations representing the data, wherein the different types of the data comprise different data visualizations relative to one another;
    determining multiple intents of the collected data relating to development of the software product based on an assessment of the collected data;
    creating different viewpoints of the collected data based on the intents;
    obtaining viewpoints for an intended user, wherein the characteristic of the intended is selected from the group consisting of: a role of the intended user, a permission of the intended user, a previous recommendation corresponding to the intended user, and an activity profile of the intended user;

correlating the retrieved viewpoints for the intended user with the viewpoints of the data, wherein, in response to monitoring web browsing for the intended user, preferences for the intended user are ordered in a ranking, wherein the retrieved viewpoints are selected according to the ranking of the preferences of the intended user;

wherein transforming the collected data into the data visualizations representing the data is further based on the correlation of the viewpoints; and outputting the data visualizations in a single visual representation for display to the intended user and updating the single visual representation during runtime.

2. The computer-implemented method of claim 1, wherein the selected portion of the collected data is transformed into data visualizations representing the data using artificial intelligence.

3. The computer-implemented method of claim 1, wherein the machine learning module determines features of the selected portion of the collected data to transform into the data visualizations for display to the intended user.

4. The computer-implemented method of claim 1, wherein the different data visualizations include different features corresponding to the different types of data, the different features being selected from the group consisting of: shape, line, bar, line type, color, and fill.

5. The computer-implemented method of claim 1, comprising detecting presence of new data not already considered when creating the single visual representation; and updating the single visual representation based on the new data.

6. The computer-implemented method of claim 5, wherein the new data is transformed into a data visualization that is of a different type than any data visualizations present in the single visual representation.

7. The computer-implemented method of claim 1, comprising receiving a request to change the type of visual output of one of the data inputs to a different type; and changing the visual output for the data input to the different type.

8. The computer-implemented method of claim 1, wherein the viewpoint for the intended user is determined based on prior activities by the intended user.

9. The computer-implemented method of claim 1, comprising generating a regression model for the intended user based on the obtained viewpoints for the intended user and the viewpoints of the data correlated therewith.

10. The computer-implemented method of claim 9, comprising assigning weightings to the correlated viewpoints using the regression model;

sorting the correlated viewpoints based on weightings; and highlighting at least some of the data visualizations based on the weightings of the correlated viewpoints.

11. A computer program product for outputting data visualizations in a single visual representation, the computer program product comprising a computer readable storage medium having program instructions embodied therewith, the program instructions executable by a computer to cause the computer to perform operations comprising:

collecting data relating to development of a software product, the collected data including a plurality of different types of data relating to the development of the software product;

selecting a portion of the collected data based on a characteristic of an intended user, the portion of the collected data including a plurality of the types of data;

inputting to a machine learning module the selected portion of the collected data, the machine learning module transforming the selected portion of the collected data into data visualizations representing the data, wherein the different types of the data comprise different data visualizations relative to one another;

determining multiple intents of the collected data relating to development of the software product based on an assessment of the collected data;

creating different viewpoints of the collected data based on the intents;

obtaining viewpoints for an intended user, wherein the characteristic of the intended user is selected from the group consisting of: a role of the intended user, a permission of the intended user, a previous recommendation corresponding to the intended user, and an activity profile of the intended user;

correlating the retrieved viewpoints for the intended user with the viewpoints of the data, wherein, in response to monitoring web browsing for the intended user preferences for the intended user are ordered in a ranking, wherein the retrieved viewpoints are selected according to the ranking of the preferences of the intended user;

wherein transforming the collected data into data visualizations representing the data is further based on the correlation of the viewpoints; and outputting the data visualizations in a single visual representation for display to the intended user and update the single visual representation during runtime.

12. A system, comprising:

a hardware processor; and logic executable by the hardware processor, the logic being configured to perform operations comprising:

collecting data relating to development of a software product, the collected data including a plurality of different types of data relating to the development of the software product;

selecting a portion of the collected data based on a characteristic of an intended user, the portion of the collected data including a plurality of the types of data;

inputting to a machine learning module the selected portion of the collected data, the machine learning module transforming the selected portion of the collected data into data visualizations representing the data, wherein the different types of the data comprise different data visualizations relative to one another;

determining multiple intents of the collected data relating to development of the software product based on an assessment of the collected data;

creating different viewpoints of the collected data based on the intents;

obtaining viewpoints for an intended user, wherein the characteristic of the intended user is selected from the group consisting of: a role of the intended user, a permission of the intended user, a previous recommendation corresponding to the intended user, and an activity profile of the intended user;

correlating the retrieved viewpoints for the intended user with the viewpoints of the data, wherein, in response to monitoring web browsing for the intended user, preferences for the intended user are ordered in a ranking, wherein the retrieved viewpoints are selected according to the ranking of the preferences of the intended user;

wherein transforming the collected data into the data visualizations representing the data is further based on the correlation of the viewpoints; and outputting the data visualizations in a single visual representation for display to the intended user and update the single visual representation during runtime.

* * * * *